US012001867B2

(12) United States Patent
Shen et al.

(10) Patent No.: US 12,001,867 B2
(45) Date of Patent: Jun. 4, 2024

(54) METHOD AND SYSTEM FOR IMPROVING SOFTWARE CONTAINER PERFORMANCE AND ISOLATION

(71) Applicant: Cornell University, Ithaca, NY (US)

(72) Inventors: Zhiming Shen, Ithaca, NY (US); Robbert van Renesse, Ithaca, NY (US); Hakim Weatherspoon, Ithaca, NY (US)

(73) Assignee: Cornell University, Ithaca, NY (US)

( * ) Notice: Subject to any disclaimer, the term of this patent is extended or adjusted under 35 U.S.C. 154(b) by 806 days.

(21) Appl. No.: 17/046,632

(22) PCT Filed: Apr. 11, 2019

(86) PCT No.: PCT/US2019/026995
§ 371 (c)(1),
(2) Date: Oct. 9, 2020

(87) PCT Pub. No.: WO2019/200102
PCT Pub. Date: Oct. 17, 2019

(65) Prior Publication Data
US 2021/0109775 A1    Apr. 15, 2021

Related U.S. Application Data

(60) Provisional application No. 62/656,051, filed on Apr. 11, 2018.

(51) Int. Cl.
*G06F 9/455*    (2018.01)
*G06F 9/54*    (2006.01)
(52) U.S. Cl.
CPC ........ *G06F 9/45558* (2013.01); *G06F 9/4555* (2013.01); *G06F 9/545* (2013.01); *G06F 2009/45587* (2013.01)

(58) Field of Classification Search
CPC .... G06F 9/45558; G06F 9/4555; G06F 9/545; G06F 2009/45587
See application file for complete search history.

(56) References Cited

U.S. PATENT DOCUMENTS

| 7,730,486 B2 | 6/2010 | Herington |
| 8,875,160 B2 | 10/2014 | Hunt et al. |

(Continued)

FOREIGN PATENT DOCUMENTS

| CN | 102713847 A | 10/2012 |
| JP | 2006244481 A | 9/2006 |

(Continued)

OTHER PUBLICATIONS

Yiming Zhang, KylinX: A Dynamic Library Operating System for Simplified and Efficient Cloud Virtualization, Jul. 11, 2018; USENIX (Year: 2018).*

(Continued)

*Primary Examiner* — Dong U Kim
(74) *Attorney, Agent, or Firm* — Ryan, Mason & Lewis, LLP

(57) ABSTRACT

A method in one embodiment comprises implementing a kernel-based isolation layer, configuring a software container on the kernel-based isolation layer to include a dedicated operating system kernel as a library operating system, and executing one or more user processes in the software container. The method is performed by a cloud-based processing platform, an enterprise processing platform, or other type of processing platform comprising a plurality of processing devices, with each such processing device comprising a processor coupled to a memory. The library operating system illustratively runs in the software container at a privilege level that is the same as a privilege level of the one or more user processes executing in the software container. The library operating system is illustra- (Continued)

tively configured to support automatic translation of binaries of the one or more user processes in conjunction with converting system calls into corresponding function calls.

23 Claims, 10 Drawing Sheets

(56) References Cited

U.S. PATENT DOCUMENTS

| | | | |
|---|---|---|---|
| 8,959,484 | B2 | 2/2015 | Pinnix |
| 9,606,822 | B2 | 3/2017 | Hunt et al. |
| 9,766,915 | B1* | 9/2017 | Emelyanov ............. G06F 9/455 |
| 9,891,939 | B2 | 2/2018 | Hunt et al. |
| 10,042,661 | B1 | 8/2018 | Emelyanov |
| 10,204,220 | B1 | 2/2019 | Koryakin et al. |
| 2005/0060722 | A1 | 3/2005 | Rochette et al. |
| 2006/0195715 | A1 | 8/2006 | Herington |
| 2007/0028244 | A1 | 2/2007 | Landis et al. |
| 2011/0113467 | A1 | 5/2011 | Agarwal et al. |
| 2012/0227038 | A1 | 9/2012 | Hunt et al. |
| 2012/0227058 | A1 | 9/2012 | Hunt et al. |
| 2012/0227061 | A1 | 9/2012 | Hunt et al. |
| 2013/0054734 | A1* | 2/2013 | Bond .................... G06F 9/4856 709/217 |
| 2013/0151824 | A1 | 6/2013 | Bugnion |
| 2014/0025770 | A1* | 1/2014 | Warfield ............... G06F 16/256 709/213 |
| 2014/0358848 | A1 | 12/2014 | Guarrieri et al. |
| 2015/0150003 | A1 | 5/2015 | Emelyanov et al. |
| 2015/0248554 | A1* | 9/2015 | Dumitru ................. G06F 21/56 718/1 |
| 2016/0162292 | A1 | 6/2016 | Bugnion |
| 2016/0171250 | A1* | 6/2016 | Boivie .................... G06F 21/53 713/189 |
| 2016/0205172 | A1* | 7/2016 | Chadha ............... G06F 9/45558 709/217 |
| 2016/0371496 | A1* | 12/2016 | Sell ....................... G06F 21/604 |
| 2017/0039080 | A1* | 2/2017 | Chadha ............... G06F 9/45558 |
| 2017/0097851 | A1* | 4/2017 | Chen ................... G06F 9/45558 |
| 2017/0116415 | A1 | 4/2017 | Stopel et al. |
| 2017/0206352 | A1 | 7/2017 | Brech et al. |
| 2018/0046446 | A1 | 2/2018 | Turovsky et al. |
| 2018/0196654 | A1 | 7/2018 | Bo et al. |
| 2018/0205652 | A1 | 7/2018 | Saxena |
| 2018/0239612 | A1 | 8/2018 | Hu et al. |
| 2021/0320938 | A1* | 10/2021 | Ober ........................ G06F 8/61 |

FOREIGN PATENT DOCUMENTS

| | | |
|---|---|---|
| JP | 2014510343 A | 4/2014 |
| WO | 2019200102 A1 | 10/2019 |

OTHER PUBLICATIONS

Japanese Patent Application Serial No. 2020-555910, Office Action and English Language Machine Translation, dated Apr. 20, 2023, 12 pages.
R. Olinsky et al., "Drawbridge," Microsoft and Internet Archive, Oct. 3, 2016, retrieved on Apr. 14, 2023, https://web.archive.org/web/20161003125852/https://www.microsoft.com/en-us/research/project/drawbridge/, 7 pages.
R. Olinsky et al., "Drawbridge," https://www.microsoft.com/en-us/research/project/drawbridge/, Sep. 19, 2011, retrieved, Apr. 24, 2023, 3 pages.
Extended European Search Report of European Patent Application Serial No. EP 19786127.1, dated May 2, 2022, 21 pages.
I. Mavridis et al., "Performance and Overhead Study of Containers Running on Top of Virtual Machines," 2017 IEEE 19th Conference on Business Informatics, Jul. 24, 2017, pp. 32-38, vol. 2.
D. Merkel, "Docker: Lightweight Linux Containers for Consistent Development and Deployment," Linux Journal, Mar. 1, 2014, pp. 76-91.
Z. Shen et al., "X-Containers: Breaking Down Barriers to Improve Performance and Isolation of Cloud-Native Containers," Proceedings of the 24th International Conference on Architectural Support for Programming Languages and Operating Systems, Apr. 4, 2019, pp. 121-135.
J.-Y. Hwang et al., "Xen on ARM: System Virtualization using Xen Hypervisor for ARM-based Secure Mobile Phones," 5th IEEE Consumer Communications and Networking Conference, Jan. 1, 2008, pp. 257-261.
S. Lankes et al., "A Low Noise Unikernel for Extrem-Scale Systems," Advances in Biometrics: International Conference Proceedings, Lecture Notes in Computer Science, Mar. 4, 2017, pp. 73-84.
VMware, "VMware Understanding Full Virtualization, Paravirtualization, and Hardware Assist," https://www.vmware.com/techpapers/2007/understanding-full-virtualization-paravirtualizat-1008.html, Oct. 1, 2007, 17 pages.
K. Adams et al., "A Comparison of Software and Hardware Techniques for x86 Virtualization," Proceedings of the 2005 ASPLOS Conference, ACM SIGOPS Operating Systems Review, Oct. 20, 2006, pp. 2-13, vol. 40, No. 5.
J. Dike, "A User-mode Port of the Linux Kernel," In 4th Annual Linux Showcase & Conference, Oct. 2000, 9 pages.
D. R. Engler et al., "Exokernel: An Operating System Architecture for Application-level Resource Management," In Proceedings of the Fifteenth ACM Symposium on Operating Systems Principles, Dec. 1995, 16 pages.
N. Gauthier, "Kernel Load-Balancing for Docker Containers Using IPVS," https://blog.codeship.com/kernel-load-balancing-for-docker-containers-using-ipvs/, Nov. 17, 2015, 11 pages.
S. George, "Usermode Kernel: Running the Kernel in Userspace in VM Environments," Master's Thesis, University of British Columbia, Jun. 2008, 47 pages.
C. Giuffrida et al., "Enhanced Operating System Security Through Efficient and Fine-grained Address Space Randomization," In Proceedings of the 21st USENIX Conference on Security Symposium, Aug. 2012, 16 pages.
H. Härtig et al., "The Performance of μ-Kernel-Based Systems," In Proceedings of the Sixteenth ACM Symposium on Operating Systems Principles, Oct. 5-8, 1997, 15 pages.
J. Heo et al., "Memory Overbooking and Dynamic Control of Xen Virtual Machines in Consolidated Environments," IFIP/IEEE International Symposium on Integrated Network Management, Jun. 2009, 8 pages.
G. Hunt et al., "Sealing OS Processes to Improve Dependability and Safety," ACM SIGOPS Operating Systems Review, Mar. 2007, 14 pages.
G. C. Hunt et al., "Singularity: Rethinking the Software Stack," ACM SIGOPS Operating Systems Review, Apr. 2007, 13 pages.
B. Ibryam, "Principles of Container-Based Application Design," Redhat Consulting Whitepaper, https://www.redhat.com/en/resources/cloud-native-container-design-whitepaper, 2007, 8 pages.
A. Kivity et al., "OSv: Optimizing the Operating System for Virtual Machines," In Proceedings of the 2014 USENIX Conference on USENIX Annual Technical Conference, Jun. 19-20, 2014, 12 pages.
N. Lacasse, "Open-sourcing gVisor, a Sandboxed Container Runtime," https://cloudplatform.googleblog.com/2018/05/Open-sourcing-gVisor-a-sandboxed-container-runtime.html, May 2, 2018, 7 pages.
I. Leslie et al., "The Design and Implementation of an Operating System to Support Distributed Multimedia Applications," IEEE Journal on Selected Areas in Communications, Sep. 2006, 22 pages.
M. Lipp et al., "Meltdown," arXiv:1801.01207v1, Jan. 3, 2018, 16 pages.
A. Madhavapeddy et al., "Unikernels: Library Operating Systems for the Cloud," ACM SIGARCH Computer Architecture News, Mar. 2013, 12 pages.
T. Maeda, "Kernel Mode Linux," Linux Journal, https://www.linuxjournal.com/article/6516, May 1, 2003, 9 pages.
F. Manco et al., "My VM is Lighter (and Safer) Than Your Container," In Proceedings of the 26th Symposium on Operating Systems Principles, Oct. 2017, 16 pages.

(56) References Cited

OTHER PUBLICATIONS

J. Martins et al., "ClickOS and the Art of Network Function Virtualization," In Proceedings of the 11th USENIX Conference on Networked Systems Design and Implementation, Apr. 2-4, 2014, 15 pages.

S. Newman, "Building Microservices: Designing Fine-Grained Systems," O'Reilly Media, Inc., 2015, 280 pages.

P. Padala et al., "Automated Control of Multiple Virtualized Resources." In Proceedings of the 4th ACM European Conference on Computer Systems, Apr. 2009, 16 pages.

D. E. Porter et al., "Rethinking the Library OS from the Top Down," In Proceedings of the Sixteenth International Conference on Architectural Support for Programming Languages and Operating Systems, Mar. 2011, 14 pages.

O. Purdila et al., "LKL: The Linux Kernel Library," IEEE International Conference, Jul. 2010, 6 pages.

D. Schatzberg et al., "EbbRT: A Framework for Building Per-Application Library Operating Systems," In 12th USENIX Symposium on Operating Systems Design and Implementation, Nov. 2-4, 2016, pp. 671-688.

S. Soltesz et al., "Container-based Operating System Virtualization: A Scalable, High-performance Alternative to Hypervisors," In Proceedings of the 2nd ACM SIGOPS/EuroSys European Conference on Computer Systems, Mar. 2007, 14 pages.

M. M. Swift et al., "Improving the Reliability of Commodity Operating Systems," In Proceedings of the 19th ACM Symposium on Operating Systems Principles, Oct. 2003, 33 pages.

C.-C. Tsai et al., "Cooperation and Security Isolation of Library OSes for Multi-Process Applications," In Proceedings of the Ninth European Conference on Computer Systems, Apr. 2014, 14 pages.

R. Wahbe et al., "Efficient Software-based Fault Isolation," In Proceedings of the Fourteenth ACM Symposium on Operating Systems Principles, Dec. 1993, 14 pages.

D. Williams et al, "The Xen-Blanket: Virtualize Once, Run Everywhere," In Proceedings of the 7th ACM European Conference on Computer Systems, Apr. 2012, 14 pages.

T. E. Anderson, "The Case for Application-specific Operating Systems," Proceedings Third Workshop on Workstation Operating Systems, Apr. 1992, 3 pages.

R. Krishnamurthy et al., "On the Impact of Scheduler Settings on the Performance of Multi-Threaded SIP Servers," In 2015 IEEE International Conference on Communications, Jun. 2015, 6 pages.

hypercontainer.io, "Hypervisor-agnostic Docker Runtime," https://web.archive.org/web/20190120143125/https://hypercontainer.io/, Accessed Oct. 8, 2020, 3 pages.

Clear Linux Project, "ClearLinux OS, Containers Made Simple," https://web.archive.org/web/20190401163018/https://clearlinux.org/containers, Accessed Oct. 8, 2020, 4 pages.

E. Brewer, "Kubernetes and the Path to Cloud Native," https://www.yumpu.com/en/document/read/54433328/kubernetes-the-path-to-cloud-native, Aug. 28, 2015, 14 pages.

A. M. Azab et al., "SKEE: A Lightweight Secure Kernel-level Execution Environment for ARM," NDSS '16, Feb. 21-24, 2016, 15 pages.

A. Bratterud et al., "Enhancing Cloud Security and Privacy: The Unikernel Solution," Cloud Computing 2017: The Eighth International Conference on Cloud Computing, GRIDs, and Virtualization, 2017, 8 pages.

M. Primorac, "Combining Dataplane Operating Systems and Containers for Fast and Isolated Datacenter Applications," EDIC Research Proposal, Jun. 3, 2015, 8 pages.

K. Kourai et al., "Seamless and Secure Application Consolidation for Optimizing Instance Deployment in Clouds," 2016 IEEE International Conference on Cloud Computing Technology and Science, Dec. 2016, 8 pages.

C.-C. Tsai et al., "Graphene-SGX: A Practical Library OS for Unmodified Applications on SGX," USENIX Annual Technical Conference, Jul. 12-14, 2017, 14 pages.

T. Combe et al., "To Docker or Not to Docker: A Security Perspective," IEEE Cloud Computing, vol. 3, No. 5, 2016, 9 pages.

Y. Zhai et al., "CQSTR: Securing Cross-Tenant Applications with Cloud Containers," In Proceedings of th Seventh ACM Symposium on Cloud Computing, Oct. 2016, 14 pages.

OSv, "OSv—the Operating System Designed for the Cloud," http://osv.io/, Accessed Oct. 6, 2020, 2 pages.

Amazon Web Services, Inc., "AWS—Lambda," https://aws.amazon.com/lambda/, Accessed Oct. 6, 2020, 13 pages.

G. Banga et al., "Resource Containers: A New Facility for Resource Management in Server Systems," Proceedings of the 3rd Symposium on Operating Systems Design and Implementation, Feb. 1999, 13 pages.

R. J. Creasy, "The Origin of the VM/370 Time-sharing System," IBM Journal of Research Development, vol. 25, No. 5, Sep. 1981, 8 pages.

N. Provos et al., "Preventing Privilege Escalation," In USENIX Security Symposium, 2013, 11 pages.

J. Sugerman et al., "Virtualizing I/O Devices on VMware Workstation's Hosted Virtual Machine Monitor," Proceedings of the 2001 USENIX Annual Technical Conference, Jun. 25-30, 2001, 14 pages.

Corbet, "SMP Alternatives," https://lwn.net/Articles/164121, Dec. 14, 2005, 10 pages.

Xen, "X86 Paravirtualised Memory Management," https://wiki.xen.org/wiki/X86_Paravirtualised_Memory_Management, May 27, 2015, 12 pages.

Intel, "Intel 64 and IA-32 Architectures Software Developer's Manual," vol. 3 (3A, 3B, 3C & 3D): System programming Guide, May 2020, 1750 pages.

Wikipedia, "Kernel Page-table Isolation," https://en.wikipedia.org/wiki/Kernel_page-table_isolation, Mar. 3, 2020, 4 pages.

Google, "Enabling Nested Virtualization for VM Instances," https://cloud.google.com/compute/docs/instances/enable-nested-virtualization-vm-instances#performance, Oct. 2, 2020, 19 pages.

Wikipedia, "Solaris Containers," https://en.wikipedia.org/wiki/Solaris_Containers, Jul. 10, 2020, 5 pages.

Amazon Web Services, Inc., "Amazon ECS Task Definitions," https://docs.aws.amazon.com/AmazonECS/latest/developerguide/task_definitions.html, Accessed Oct. 6, 2020, 2 pages.

Docker Inc., "Best practices for Writing Dockerfiles," https://docs.docker.com/develop/develop-images/dockerfile_best-practices/, Accessed Oct. 6, 2020, 15 pages.

CVE, "List of Cybersecurity Vulnerabilities," https://cve.mitre.org/, Accessed Oct. 6, 2020, 2 pages.

Docker Inc., "Get Started with Docker," https://www.docker.com/, Accessed Oct. 6, 2020, 5 pages.

Free Software Foundation, Inc., "GNU General Public License," https://www.gnu.org/licenses/gpl-3.0.html, Jun. 29, 2007, 10 pages.

Github, "Application Kernel for Containers," https://github.com/google/gvisor, Accessed Oct. 6, 2020, 5 pages.

Microsoft, "Isolation Modes," https://docs.microsoft.com/en-us/virtualization/windowscontainers/manage-containers/hyperv-container, Sep. 26, 2019, 5 pages.

Kata Containers, "The Speed of Containers, The Security of VMs," https://katacontainers.io, Accessed Oct. 6, 2020, 4 pages.

Github, "The Hypervisor-based Container Runtime for Kubernetes," https://github.com/kubernetes/frakti, Accessed Oct. 6, 2020, 6 pages.

Linux Containers, "Infrastructure for Container Projects," https://linuxcontainers.org/, Accessed Oct. 6, 2020, 3 pages.

CVE, "List of Security Vulnerabilities in the Linux Kernel," https://www.cvedetails.com/vulnerability-list/vendor_id-33/product_id-47/cvssscoremin-7/cvssscoremax-7.99/Linux-Linux-Kernel.html, Accessed Oct. 6, 2020, 4 pages.

OpenVZ, "Open Source Container-based Virtualization for Linux," https://openvz.org/Main_Page, Accessed Oct. 6, 2020, 3 pages.

Kubernetes, "Pods," https://kubernetes.io/docs/concepts/workloads/pods/pod/, Sep. 28, 2020, 4 pages.

Github, "The Rumprun Unikernal and Toolchain for Various Platforms," https://github.com/rumpkernel/rumprun, Accessed Oct. 6, 2020, 3 pages.

Github, "Hypervisor-based Runtime for OCI," https://github.com/rumpkernel/rumprun, Accessed Oct. 6, 2020, 6 pages.

loop.org, "User Mode Linux FAQ," http://uml.devloop.org.uk/faq.html, Accessed Oct. 6, 2020, 2 pages.

(56) References Cited

OTHER PUBLICATIONS

VWware, "VMware vSphere Integrated Containers 1.5.4 Release Notes," https://www.vmware.com/products/vsphere/integrated-containers.html, Sep. 24, 2019, 3 pages.

Free Software Foundation, Inc., "What is the Difference Between an 'Aggregate' and Other Kinds of 'Modified Versions'?" https://www.gnu.org/licenses/gpl-faq.en.html#MereAggregation, Accessed Oct. 6, 2020, 1 page.

M. Accetta et al., "Mach: A New Kernel Foundation for UNIX Development," Research paper, Carnegie Mellon University, 1986, 16 pages.

S. Arnautov et al., "SCONE: Secure Linux Containers with Intel SGX," In 12th USENIX Symposium on Operating Systems Design and Implementation, Nov. 2-4, 2016, pp. 689-703.

A. Balalaie et al., "Microservices Architecture Enables DevOps: Migration to a Cloud-Native Architecture," IEEE Software vol. 33, No. 3, May 2016, 13 pages.

A. Balalaie et al., "Migrating to Cloud-Native Architectures Using Microservices: An Experience Report," arXiv:1507.08217v1, Jul. 29, 2015, 15 pages.

P. Barham et al., "Xen and the Art of Virtualization," In Proceedings of the Nineteenth ACM Symposium on Operating Systems Principles, Oct. 19-22, 2003, 14 pages.

L. Bass et al.,"DevOps: A Software Architect's Perspective," Addison-Wesley Professional, 2015, 54 pages.

A. Baumann et al., "Shielding Applications from an Untrusted Cloud with Haven," In Proceedings of the 11th USENIX Symposium on Operating Systems Design and Implementation, Oct. 6-8, 2014, 18 pages.

A. Belay et al., "Dune: Safe User-level Access to Privileged CPU Features," In Proceedings of the 10th USENIX Conference on Operating Systems Design and Implementation, Oct. 2012, 14 pages.

A. Belay et al., "IX: A Protected Dataplane Operating System for High Throughput and Low Latency," In Proceedings of the 11th USENIX Symposium on Operating Systems Design and Implementation, Oct. 6-8, 2014, 17 pages.

B. N. Bershad et al., "Extensibility Safety and Performance in the SPIN Operating System," In Proceedings of the Fifteenth ACM Symposium on Operating Systems Principles, Dec. 1995, 17 pages.

B. Burns et al., "Design Patterns for Container-based Distributed Systems," In 8th USENIX Workshop on Hot Topics in Cloud Computing, Jun. 2016, 6 pages.

D. R. Cheriton et al., "A Caching Model of Operating System Kernel Functionality," In Proceedings of the 1st USENIX Conference on Operating Systems Design and Implementation, Nov. 1994, 15 pages.

Datadog, "8 Surprising Facts About Real Docker Adoption," https://www.datadoghq.com/docker-adoption/, Jun. 2018, 16 pages.

A. Baumann et al., "Composing OS Extensions Safely and Efficiently with Bascule," Proceedings of the 8th ACM European Conference on Computer Systems, Apr. 2013, 14 pages.

\* cited by examiner

FIG. 6

```
00000000000eb6a0 <__read>:
eb6a9:        b8 00 00 00 00              mov      $0x0, %eax
eb6ae:        0f 05                       syscall
```
⬇ 7-BYTE REPLACEMENT (CASE 1)

```
00000000000eb6a0 <__read>:
eb6a9:        ff 14 25 08 00 60 ff        callq    *0xffffffffff600008
```
---
```
000000000007f400 < syscall.Syscall>:
7f41d:        48 8b 44 24 08              mov      0x8 (%rsp), %eax
7f422:        0f 05                       syscall
```
⬇ 7-BYTE REPLACEMENT (CASE 2)

```
000000000007f400 < syscall.Syscall>:
7f41d:        ff 14 25 08 0c 60 ff        callq    *0xffffffffff600c08
```
---
```
0000000000010330 <__restore_rt>:
10330:        48 c7 c0 0f 00 00 00        mov      $0xf, %rax
10337:        0f 05                       syscall
```
⬇ 9-BYTE REPLACEMENT (PHASE-1)

```
0000000000010330 <__restore_rt>:
10330:        ff 14 25 08 00 60 ff        callq    *0xffffffffff600080
10337:        0f 05                       syscall
```
⬇ 9-BYTE REPLACEMENT (PHASE-2)

```
0000000000010330 <__restore_rt>:
10330:        ff 14 25 80 00 60 ff        callq    *0xffffffffff600080
10337:        ef f7                       jmp 0x10330
```

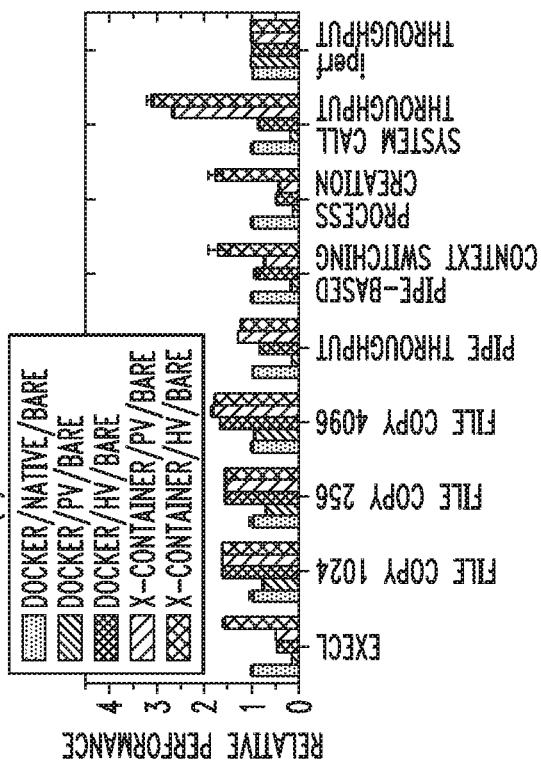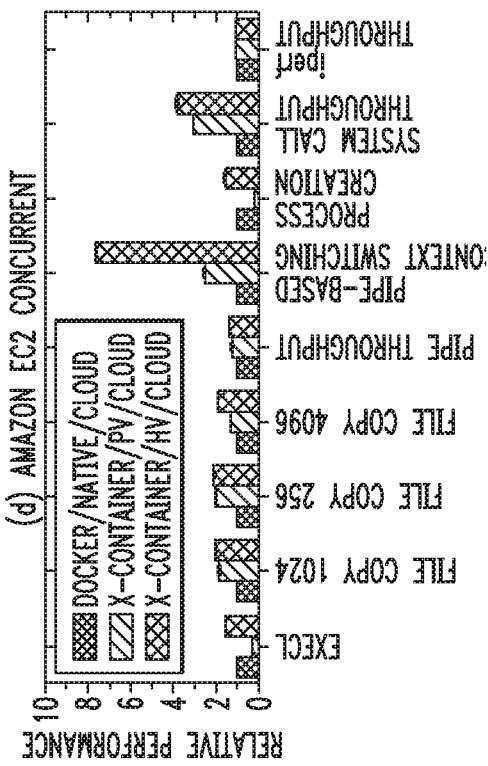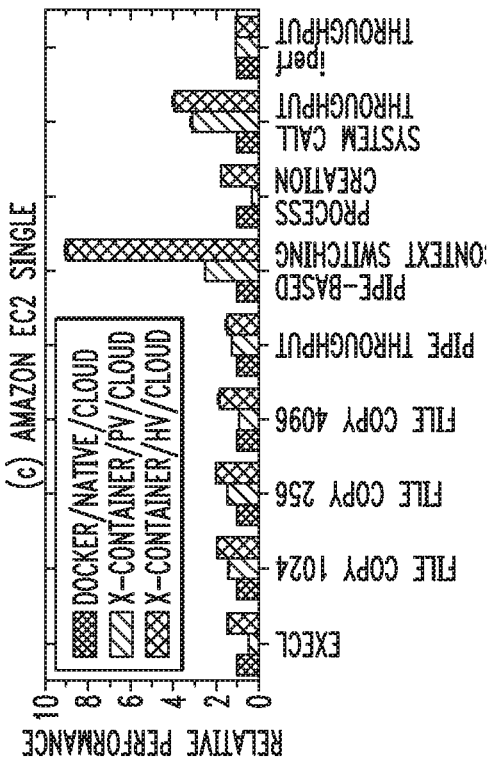
FIG. 8

FIG. 9
NGINX WEB SERVER THROUGHPUT
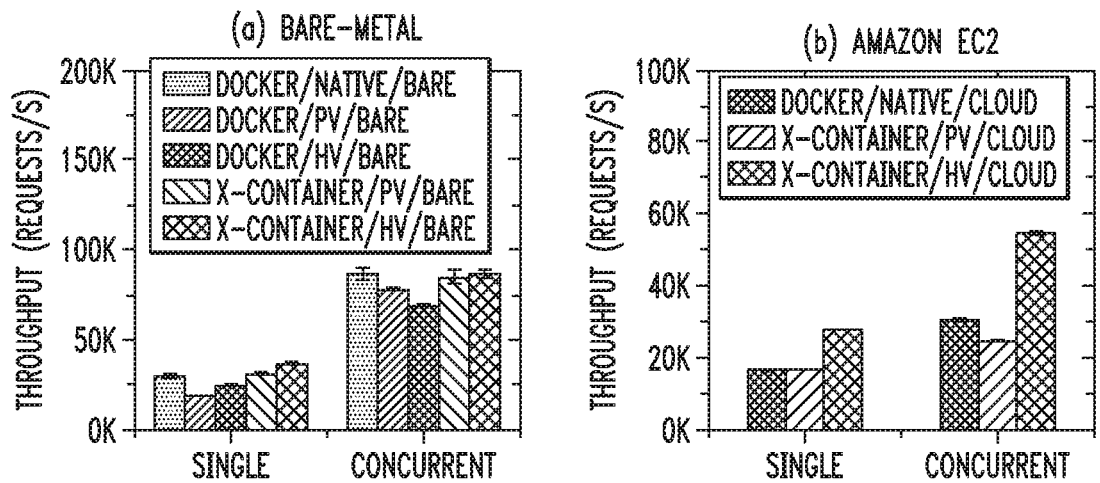
KERNAL COMPILATION TIME (LOWER IS BETTER)
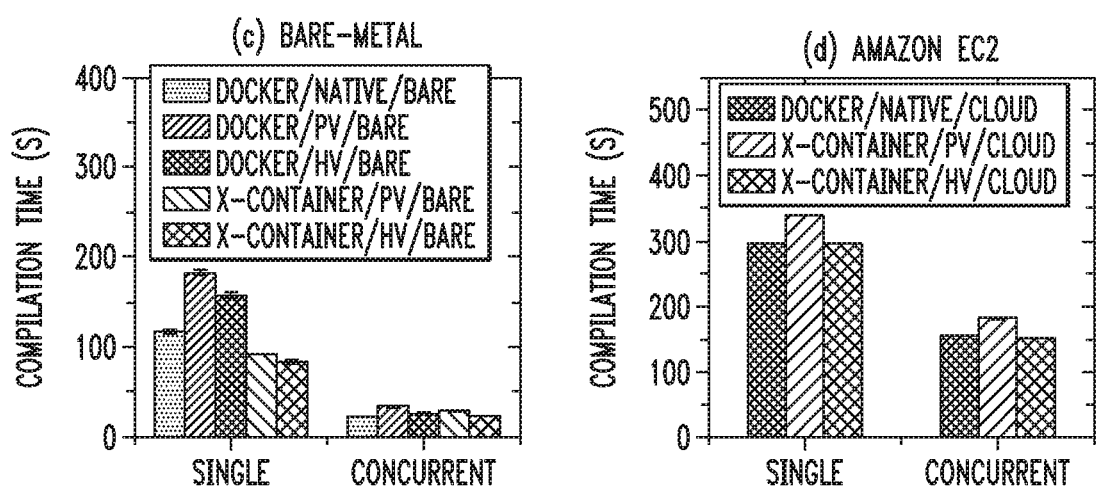

METHOD AND SYSTEM FOR IMPROVING SOFTWARE CONTAINER PERFORMANCE AND ISOLATION

PRIORITY CLAIM

The present application claims priority to U.S. Provisional Patent Application Ser. No. 62/656,051, filed Apr. 11, 2018 and entitled "Method and System for Improving Software Container Performance and Isolation," which is incorporated by reference herein in its entirety.

STATEMENT OF GOVERNMENT SUPPORT

This invention was made with government support under Contract Nos. CSR-1422544, CNS-1601879, CSR-1704742, 1053757, and 0424422 awarded by the National Science Foundation (NSF); Contract Nos. 60NANB15D327 and 70NANB17H181 awarded by the National Institute of Standards and Technology (NIST); and Contract Nos. FA8750-10-2-0238, FA8750-11-2-0256 and D11AP00266 awarded by the Defense Advanced Research Projects Agency (DARPA). The government has certain rights in the invention.

FIELD

The field relates generally to information processing systems, and more particularly to software containers utilized in such systems.

BACKGROUND

Containers have become a preferred method of packaging applications and are a key component in serverless architectures and numerous other types of processing platforms. At the same time, the exokernel architecture is gaining traction, with hypervisors serving as exokernels and many Library Operating Systems (OSs) being offered or under development. Exokernels, because of their small Trusted Computing Base (TCB) and attack surface, have superior security isolation properties, while Library OSs can be customized for a particular application. Unfortunately, these two trends are not currently compatible with one another. Current Library OSs lack binary compatibility and support for multiple processes, as needed to run modern application containers.

SUMMARY

Illustrative embodiments provide improved software containers referred to herein as X-Containers. In an X-Containers architecture in one or more embodiments, an X-Container runs with a dedicated Linux kernel as a Library OS on an X-Kernel, illustratively implemented using one of a virtual machine hypervisor and a host operating system. The X-Kernel is an example of what is more generally referred to herein as a "kernel-based isolation layer." The resulting X-Container arrangements illustratively support unmodified multi-processing applications and optimize application binary replacement automatically on the fly. X-Containers in some embodiments of this type advantageously provide substantial reductions in system call overhead compared to unmodified Linux, while also significantly outperforming Library OSs like Unikernel and Graphene on web benchmarks.

In one embodiment, a method comprises implementing a kernel-based isolation layer, configuring a software container on the kernel-based isolation layer to include a dedicated operating system kernel as a library operating system, and executing one or more user processes in the software container. The method is performed by a cloud-based processing platform, an enterprise processing platform or other type of processing platform comprising a plurality of processing devices, with each such processing device comprising a processor coupled to a memory.

The library operating system illustratively runs in the software container at a privilege level that is the same as a privilege level of the one or more user processes executing in the software container.

The library operating system in some embodiments is illustratively configured to support automatic translation of binaries of the one or more user processes in conjunction with converting system calls into corresponding function calls.

These and other illustrative embodiments of the invention include but are not limited to systems, methods, apparatus, processing devices, integrated circuits, and computer program products comprising processor-readable storage media having software program code embodied therein.

BRIEF DESCRIPTION OF THE FIGURES

FIG. 6 shows examples of binary replacement implemented in one or more X-Containers in an illustrative embodiment.

FIGS. 8 through 12 are plots showing results of evaluations performed on illustrative embodiments.

DETAILED DESCRIPTION

Embodiments of the invention can be implemented, for example, in the form of information processing systems comprising computer networks or other arrangements of networks, clients, servers, processing devices and other components. Illustrative embodiments of such systems will be described in detail herein. It should be understood, however, that embodiments of the invention are more generally applicable to a wide variety of other types of information processing systems and associated networks, clients, servers, processing devices or other components. Accordingly, the term "information processing system" as used herein is intended to be broadly construed so as to encompass these and other arrangements.

Figure 1:
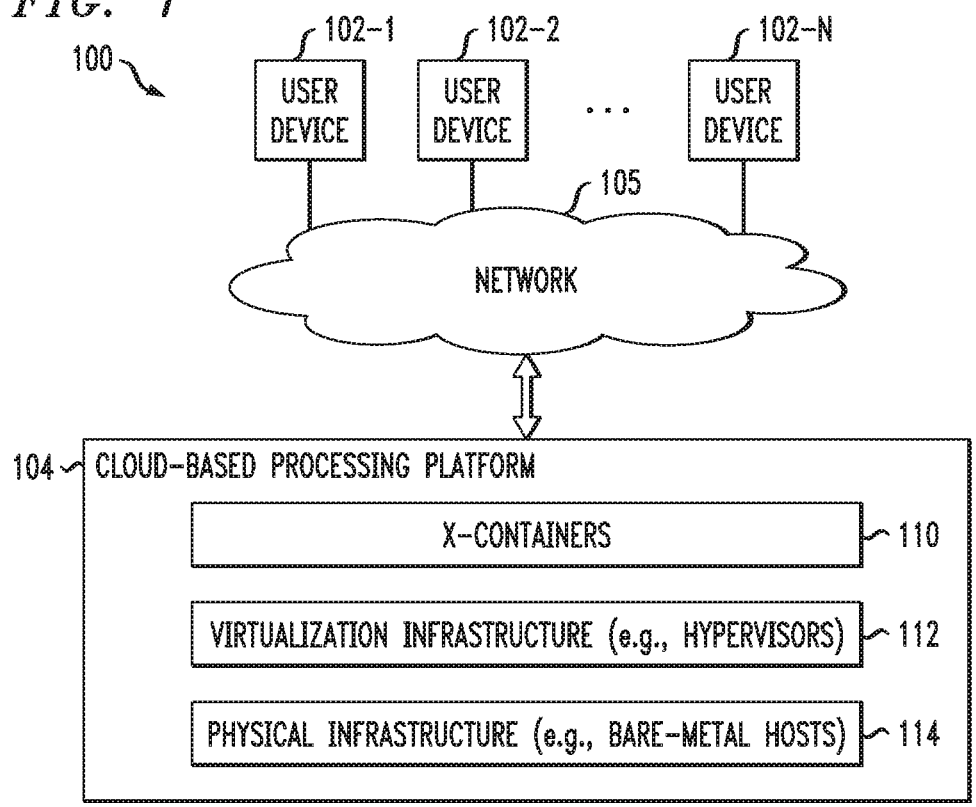
FIG. 1 shows an information processing system comprising a cloud-based processing platform implementing X-Containers in an illustrative embodiment.

FIG. 1 shows an information processing system 100 implementing X-Containers in an illustrative embodiment. The system 100 comprises a plurality of user devices 102-1, 102-2, . . . 102-N. The user devices 102 are configured to communicate with a cloud-based processing platform 104 over a network 105.

One of more of the user devices 102 can each comprise, for example, a laptop computer, tablet computer or desktop personal computer, a mobile telephone, or another type of computer or communication device, as well as combinations of multiple such devices. In some embodiments, one or more of the user devices 102 can comprise respective compute nodes, illustratively implemented on one or more processing platforms, possibly including the cloud-based processing platform 104.

Communications between the various elements of system 100 are assumed to take place over one or more networks collectively represented by network 105 in the figure. The network 105 can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The cloud-based processing platform 104 is an example of what is more generally referred to herein as a "processing platform" comprising a plurality of processing devices each comprising a processor coupled to a memory. One or more of the processing devices can each include multiple processors and/or multiple memories.

A processor of a given such processing device of a processing platform can comprise, for example, a microprocessor, an application-specific integrated circuit (ASIC), a field-programmable gate array (FPGA), a central processing unit (CPU), an arithmetic logic unit (ALU), a graphics processing unit (GPU), a digital signal processor (DSP), or other similar processing device component, as well as other types and arrangements of processing circuitry, in any combination.

A memory of a given such processing device of a processing platform can comprise, for example, electronic memory such as static random access memory (SRAM), dynamic random access memory (DRAM) or other types of RAM, read-only memory (ROM), flash memory or other types of non-volatile memory, magnetic memory, optical memory, or other types of storage devices in any combination.

The memory illustratively stores program code for execution by the process. Such a memory is an example of what is more generally referred to herein as a "processor-readable storage medium" having program code embodied therein.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with implementing X-Containers as disclosed herein.

A given processing device of the cloud-based processing platform 104 or other processing platform disclosed herein will typically include other components in addition to the above-noted processor and memory. For example, the given processing device illustratively includes a network interface configured to allow the processing device to communicate over the network 105 with other system elements. Such a network interface illustratively comprises one or more conventional transceivers.

The cloud-based processing platform 104 in the present embodiment more particularly implements a plurality of X-Containers 110 utilizing virtualization infrastructure 112 running on physical infrastructure 114. The physical infrastructure 114 illustratively comprises a plurality of processing devices of the type described above, each comprising at least one processor and at least one memory. For example, in some embodiments the physical infrastructure comprises bare-metal hosts or other types of computers or servers. The virtualization infrastructure 112 in some embodiments comprises virtual machine hypervisors, although hypervisors are not required to implement X-Containers 110. Accordingly, virtualization infrastructure 112 can be eliminated in other embodiments.

Figure 2:
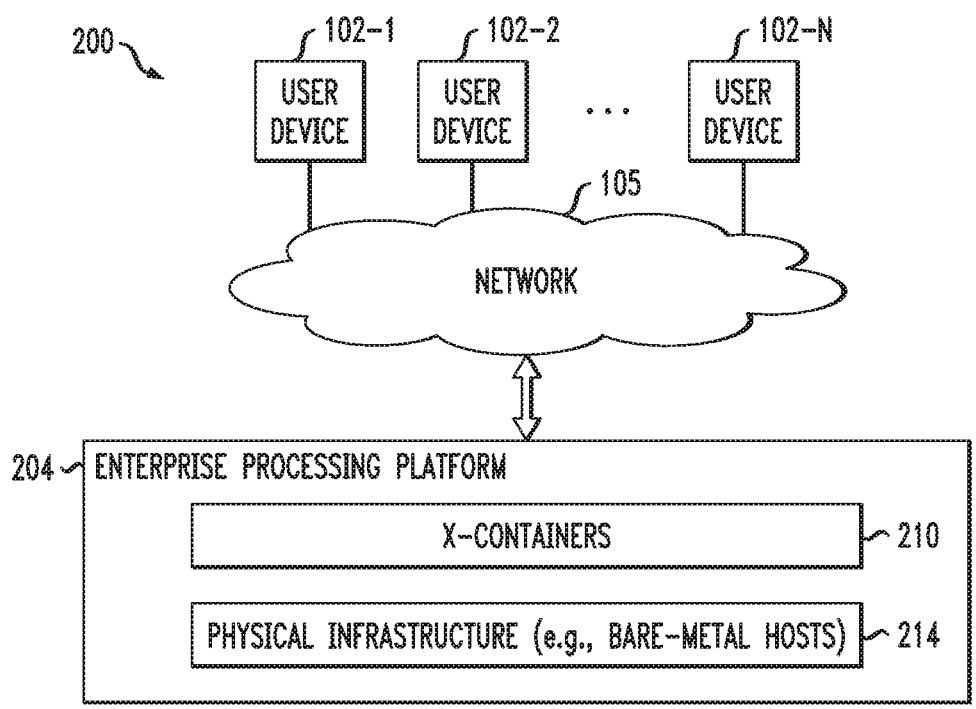
FIG. 2 shows an information processing system comprising an enterprise processing platform implementing X-Containers in an illustrative embodiment.

Information processing system 200 of FIG. 2 represents one possible alternative embodiment which does not include virtualization infrastructure such as virtualization infrastructure 112. In the system 200, an enterprise processing platform 204 implements a plurality of X-Containers 210 directly on physical infrastructure 214, eliminating any hypervisors or other virtualization infrastructure between the X-Containers 210 and the underlying physical infrastructure 214, the latter being illustratively implemented as bare-metal hosts or other types of computers or servers. The other elements of system 200 are otherwise generally the same as those previously described in conjunction with system 100 FIG. 1.

It is to be appreciated that the particular arrangements of systems 100 and 200 as shown in respective FIGS. 1 and 2 are presented by way of illustrative example only, and numerous other arrangements are possible.

For example, although these embodiments implement X-Containers in respective cloud-based and enterprise processing platforms, a wide variety of additional or alternative processing platforms can be used, such as Internet of Things (IoT) platforms and Network Function Virtualization (NFV) platforms.

Other examples include platforms implemented in accordance with Platform-as-a-Service (PaaS) models, Software-as-a-Service (SaaS) models, Infrastructure-as-a-Service (IaaS) models and/or Function-as-a-Service (FaaS) models, as well as enterprise application container platforms, serverless computing platforms, microservices platforms, and cloud-based native application platforms, as well as other general cloud computing or enterprise computing infrastructures. More generally, X-Containers can be implemented on any platform that can benefit from their security and performance advantages.

In implementing the X-Containers 110 or 210, the systems 100 or 200 are illustratively configured to implement what is referred to herein as a "kernel-based isolation layer." A given one of the X-Containers 110 or 210 is illustratively configured as a software container on the kernel-based isolation layer. The given X-Container includes a dedicated operating system kernel as a library operating system, and one or more user processes are executed in the given X-Container. The kernel-based isolation layer in some embodiments is more particularly implemented in the form of an X-Kernel relative to the dedicated operating system kernel of the X-Container. The X-Kernel can more particularly comprise a virtual machine hypervisor or at least a portion of a host operating system. Other types of kernel-based isolation layers can be used in other embodiments.

Figure 3:
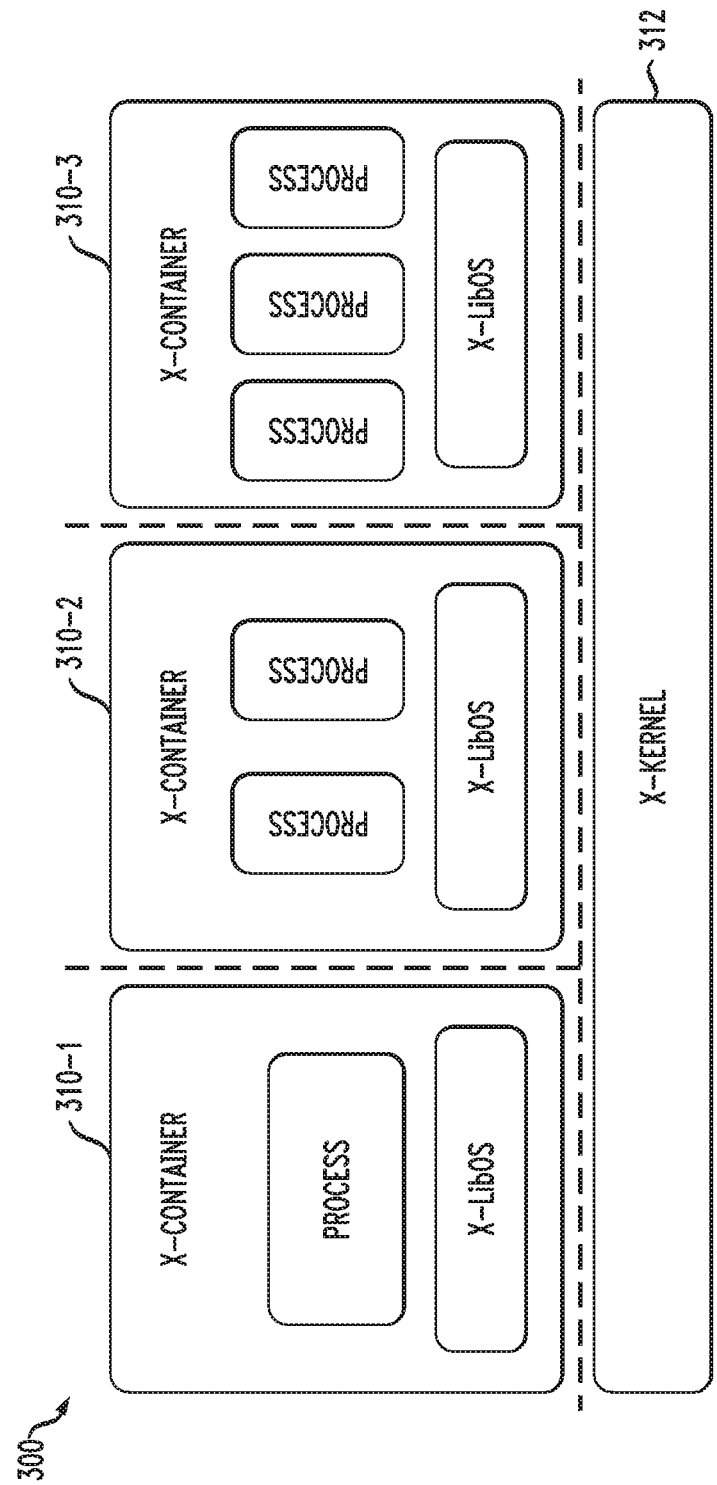
FIG. 3 shows an example arrangement of X-Containers in an illustrative embodiment.

FIG. 3 shows a portion of an information processing system 300 comprising an example arrangement of X-Containers 310 in an illustrative embodiment. The X-Containers 310 in this example more particularly comprise first, second and third X-Containers 310-1, 310-2 and 310-3, all implemented on an X-Kernel 312.

As indicated above, an X-Kernel in some embodiments can comprise a virtual machine hypervisor (e.g., Xen). For example, the X-Kernel 312 in a given embodiment of this type can be implemented using one or more virtual machine hypervisors of the virtualization infrastructure 112 of FIG. 1. Virtual machines are also referred to herein as respective VMs.

The X-Kernel 312 in other embodiments can comprise at least a portion of a host operating system. For example, in embodiments of this type, a Linux kernel or a Windows OS kernel can be used to implement the X-Kernel. Such an embodiment illustratively runs directly on the physical infrastructure 214 of FIG. 2.

By way of example only, the first X-Container 310-1 comprises a single user process, the second X-Container 310-2 comprises two user processes, and the third X-Container 310-3 comprises three user processes. Different numbers and arrangements of X-Containers and their respective associated process or processes can be used.

Each of the X-Containers 310 in the FIG. 3 embodiment comprises a corresponding dedicated operating system kernel as a library operating system, denoted X-LibOS in the figure. The X-LibOS is illustratively converted from a monolithic operating system kernel of a specified type. The X-LibOS runs in the X-Container at a privilege level that is the same as a privilege level of the one or more user processes executing in the X-Container. The X-LibOS is illustratively configured to support automatic translation of binaries of the one or more user processes in conjunction with converting system calls into corresponding function calls, as will be described in more detail elsewhere herein.

As noted above, each of the X-Containers 310 on the X-Kernel 312 includes a separate dedicated operating system kernel as its corresponding X-LibOS instance. Different sets of one or more user processes execute in respective ones of the X-Containers 310 using their respective X-LibOS instances. Accordingly, the user processes executing in any one of the X-Containers 310 are securely isolated from the user processes executing in each of the other ones of the X-Containers 310.

The X-Kernel 312 and the X-LibOS instances of the respective X-Containers 310 need not all utilize the same type of operating system. For example, the X-Kernel 312 and a given one of the X-LibOS instances can be implemented using respective first and second operating systems of different types.

In some embodiments, configuring a given one of the X-Containers 310 on the X-Kernel 312 to include a dedicated operating system kernel as its X-LibOS instance further comprises extracting a container image of an existing software container, and utilizing the extracted container image as a virtual machine image in configuring the X-Container on the X-Kernel 312. In an arrangement of this type, the X-Container on the X-Kernel 312 may comprise a wrapped version of the existing software container. One or more user processes of the existing software container in such an embodiment are illustratively permitted to execute as the one or more user processes in the given X-Container on the X-Kernel 312 without requiring any modification of those one or more user processes.

Different types of X-Containers 310 can be implemented in different embodiments. For example, the X-Containers 310 in some embodiments are implemented as what are referred to herein as para-virtualized X-Containers or PV X-Containers, in which the library operating system and the one or more user processes run in a user mode. Some embodiments of this type illustratively implement the X-Kernel 312 as a modified version of an otherwise standard virtual machine hypervisor or operating system kernel.

As another example, the X-Containers in other embodiments are implemented as what are referred to herein as hardware-assisted virtualized X-Containers or HV X-Containers, in which the library operating system and the one or more user processes run in a kernel mode within a hardware-assisted virtual machine. Some embodiments of this type implement the X-Kernel 312 as a standard virtual machine hypervisor or operating system kernel. It is also possible in other embodiments of this type that some modification may be made to the virtual machine hypervisor or operating system.

The example X-Container architecture illustrated in FIG. 3 provides improved performance and isolation for software containers. In some embodiments, the X-Container architecture turns a traditional monolithic operating system kernel such as a Linux kernel into an X-LibOS instance which runs at the same privilege level as the one or more user processes in the X-Container. The isolation of different X-Containers is guarded by a minimal trusted computing base and kernel attack surface.

Unlike traditional container implementations, X-Container isolation is not sensitive to the recently discovered Meltdown CPU bug that affects most Intel processors made in the last 20 years. Illustrative embodiments can be used to mitigate the problem of container isolation caused by this vulnerability and other security issues.

X-Containers in some embodiments are illustratively configured to automatically translate system call instructions into function calls, which enables the support of full binary compatibility, in that existing containers can run in X-Containers without any modification in some embodiments.

X-Containers exhibit enhanced isolation relative to conventional approaches. For example, the disclosed arrangements prevent a compromised container on a given host from putting other containers on that same host at risk. X-Containers provide secure container isolation for existing applications, as well as a solution to urgent container security problems such as the above-noted Meltdown vulnerability.

As noted above, X-Containers in illustrative embodiments address these and other issues by using a virtual machine hypervisor or operating system kernel for the X-Kernel (e.g., serving as a so-called "exokernel"). The traditional monolithic operating system kernel, such as the Linux Kernel, is illustratively converted into a Library OS, and it runs with the one or more user processes at the same privilege level.

The binary of user processes can be patched on the fly to translate system calls into function calls for optimized performance and full binary compatibility.

Existing Linux containers (e.g., Docker, LXC) can be wrapped into X-Containers automatically by extracting the container disk image and using it as a virtual machine image.

The X-Container architecture can be used in public container clouds or serverless computing platforms which support secure isolation and efficient execution of programs from mutually untrusted users, as well as in a wide variety of other cloud-based or enterprise processing platforms.

As mentioned previously, the X-Kernel and X-LibOS instances in some embodiments can be implemented based on different operating system types. For example, the X-Kernel can be implemented based on Xen, and X-LibOS can be implemented based on the Linux kernel.

In some embodiments, the X-Container architecture utilizes a Linux kernel modified to serve as a highly efficient LibOS so as to provide full compatibility to existing applications and kernel modules, while hypervisors or operating system kernels can be used as the exokernels to run and isolate the X-Containers.

Each X-Container illustratively hosts an application with a dedicated and possibly customized LibOS based on a Linux kernel. An X-Container can support one or more user processes, with the one or more user processes running together with the LibOS at the same privilege level. Different processes still have their own address spaces for resource management and compatibility, but they no longer provide secure isolation from one another, in that processes are used for concurrency, while X-Containers provide isolation.

The X-Container architecture automatically optimizes the binary of the application during runtime to improve performance by rewriting costly system calls into much cheaper function calls into the LibOS. X-Containers have substantially higher raw system call throughput compared to native Docker containers and are competitive with or outperform native containers for other benchmarks.

The X-Container architecture also outperforms architectures specialized for containers and serverless services. For example, we have run the wrk web benchmark with NGINX on X-Container, Unikernel, and Graphene. Under this benchmark, the X-Container architecture has comparable performance to Unikernel and about twice the throughput of Graphene. However, when running PHP and MySQL, the X-Container architecture exhibits substantially better performance than Unikernel.

While the X-Container architecture in some embodiments utilizes much of the software base of Linux, the design and implementation has to address various challenges. Illustrative embodiments include multiple distinct example designs. In a first example design, we run the Linux kernel in user mode alongside user processes on top of Xen. This requires extensive modifications to the Xen hypervisor but does not require special hardware support. Indeed, this design can run both on bare-metal and inside virtual machines in the public cloud. In a second example design, we run user processes in kernel mode alongside the Linux kernel exploiting hardware virtualization support. This design can run on any hypervisor and still securely isolates different containers. In both cases, only the architecture-dependent part of Linux has to be modified.

The X-Container architecture in some embodiments comprises an exokernel-based container architecture that is compatible with Linux containers and that provides competitive or superior performance and isolation to native Docker Containers as well as other LibOS designs. Moreover, this architecture supports secure isolation of containers without sacrificing compatibility, portability, or performance.

X-Containers as disclosed herein can be used for packaging and distributing software components, and as a fundamental building block in serverless and microservices architectures, providing advantages such as portability, in that developers can ship an application with all its dependencies in one container, which can then be run anywhere in public as well as private clouds, and performance, in that a container can be bootstrapped in milliseconds with negligible overhead compared to virtual machines. A wide variety of other use cases are supported by X-Containers in other embodiments.

It is apparent from the foregoing that X-Containers in illustrative embodiments provide significant advantages relative to conventional approaches. For example, X-Containers provide a new security model based on a Library OS, with significantly improved performance and isolation relative to conventional approaches. We support multiple processes sharing the same Library OS, an important feature for a large class of containers. With our approach, we turn the Linux kernel itself into a Library OS, providing 100% compatibility. Illustrative embodiments redirect system calls only at the first time we see them, and then convert them automatically into function calls to optimize subsequent executions. Illustrative embodiments allow running existing unmodified containers, while also optimizing the binary automatically for performance. Moreover, such embodiments have a significantly reduced attack surface and TCB, and are therefore significantly more secure. A wide variety of different implementations are possible, including embodiments without hardware virtualization support.

The above-described aspects of these and other illustrative embodiments disclosed herein are presented by way of example only, and should not be construed as limiting in any way.

Additional details regarding the operation of illustrative embodiments will now be described with reference to FIGS. 4 through 12.

Modern OSs that support multiple users and processes support various types of isolation, including kernel isolation, which ensures that a process cannot compromise the integrity of the kernel nor read confidential information that is kept in the kernel, and process isolation, which ensures that one process cannot easily access or compromise another.

The cost of securing kernel isolation can be significant. System calls to access kernel code are orders of magnitude slower than function calls into a library. Moreover, often data copies are performed in an input-output (I/O) stack for the sake of eliminating data dependencies between the kernel and user mode code. Meanwhile, there is a trend to push more and more functionality into the OS kernel, and it has become increasingly harder to defend against attacks on the kernel. Modern monolithic OS kernels such as Linux have become a huge code base with complicated services, device drivers, and system call interfaces. It is impractical to verify the security of such a complicated system, and new vulnerabilities are continually being discovered.

Process isolation is similarly problematic. For one, this type of isolation typically depends on kernel isolation due to how it is implemented and enforced. But perhaps more importantly, processes are not intended solely for security isolation. They are primarily used for resource sharing and concurrency support, and to support this modern OSs provide interfaces that transcend isolation, including shared memory, shared file systems, signaling, user groups, and debugging hooks. These mechanisms expose a big attack surface, which causes many vulnerabilities for applications that rely on processes for security isolation.

For example, Apache webservers spawn child processes with the same user ID. A compromised process can easily access other processes' memory by leveraging the debugging interface (such as ptrace) or the proc file system. Without careful configuration, a compromised process might also access the shared file system and steal information from configuration files or even databases. Finally, there exist privilege escalation attacks that can allow a hacker to acquire root privilege so as to defeat most of the process isolation mechanisms without compromising the kernel.

Indeed, few existing multi-client applications rely on processes for isolating mutual-untrusted clients, in particular, they do not dedicate a process to each client. Many do not even use processes at all. For example, popular production systems such as NGINX webserver, Apache Tomcat, My SQL, and MongoDB use an event-driven model or multi-threading instead of multi-processing. Multi-process applications such as Apache webserver use a process pool for concurrency instead of security, such that each process has multiple threads and can be re-used for serving different clients. These applications implement client isolation in the application logic, leveraging mechanisms such as role-based access control, authentication, and encryption.

There are, however, exceptions. The SSH daemon relies on process isolation to isolate different users. Also, if there are multiple applications using the same MySQL daemon on the same kernel, the combination of process isolation and client isolation built into MySQL provides the applications with security in case some applications are compromised, in that each application poses as a different client to My SQL.

Illustrative embodiments disclosed herein involve rethinking the isolation boundary, as will now be described with reference to FIG. 4.

Processes are useful for resource management and concurrency, but ideally security isolation should be decoupled from the process model. Indeed, other isolation mechanisms have been introduced.

Figure 4:
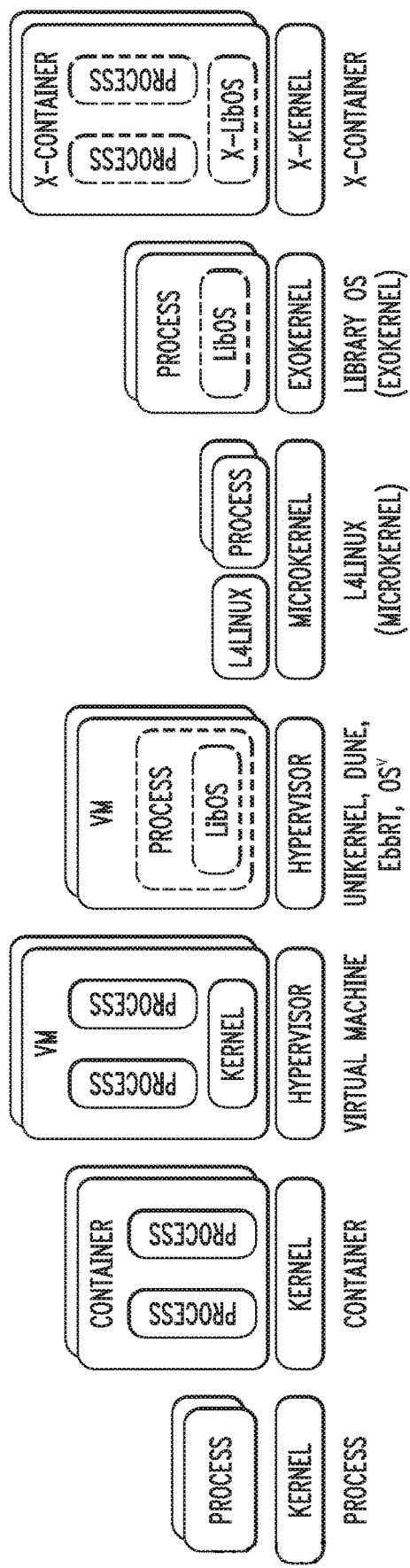
FIG. 4 illustrates isolation boundaries in various architectures including an architecture utilizing X-Containers as disclosed herein.

FIG. 4 illustrates isolation boundaries in various alternative architectures. Container isolation separates name spaces on top of a kernel such that each container appears to be its own instantiation of that kernel. However, the technology used is essentially the same as process isolation, in that any isolation that can be accomplished with containers can be accomplished without. It does not solve the problem of the kernel being a large and vulnerable TCB with a large attack surface due to the many available system calls.

From a security point-of-view, running containers in individual virtual machines (VMs), each with a dedicated kernel of its own, is a possible solution. The TCB now consists of a relatively small hypervisor with a much smaller attack surface. Unfortunately, overhead is high because of redundant resource consumption and isolation boundaries. Nonetheless, this is now the de facto solution for multi-tenant container clouds. In order to deal with the high cost of this solution, more experimental systems such as Unikernel, EbbRT, OSv, and Dune are lightweight OS kernel alternatives designed to run inside VMs. Unfortunately, these do not support existing applications well due to lack of binary-level compatibility. Also, typically they can only support single-process applications In a microkernel architecture, most of the traditional OS services run in separate user processes alongside application processes. Such architectures can provide binary compatibility. However, because different applications share those OS services, a compromised OS service breaks isolation between the applications, such that the TCB and attack surface are not reduced. Also, system call overhead tends to be large.

The X-Container architecture in illustrative embodiments herein provides an improved paradigm for security isolation between applications. For example, the architecture in some embodiments is based on an exokernel architecture, having a small kernel attack surface and low system call overhead. An individual X-Container can have multiple processes, for example, for resource management and concurrency, but those processes within the individual X-Container are not isolated from one another. Instead, users and/or applications are isolated from one another by spawning separate X-Containers for different users and/or applications. Eliminating isolation within an X-Container can reduce system call overhead to that of a function call.

As indicated above, X-Containers in illustrative embodiments use an X-LibOS based on a standard OS kernel with full binary compatibility. In some implementations, the X-LibOS is derived from Linux, and only required changes to the architecture-dependent part of Linux. The advantages of using a standard kernel are many. For example, Linux is highly optimized and mature, and is being developed by an active community. X-Containers fully leverage such advantages, but rely for isolation on the much smaller X-Kernel. In some implementations, the X-Kernel is derived from Xen.

Figure 5:
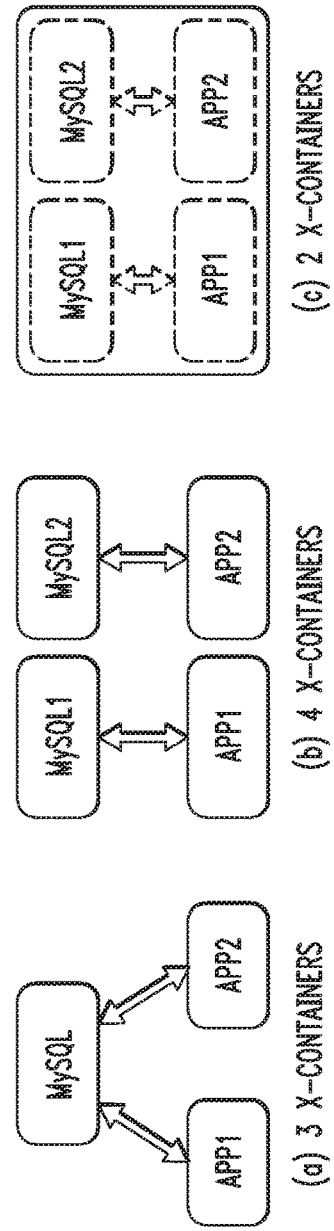
FIG. 5 shows alternative configurations of two applications using different numbers of X-Containers in illustrative embodiments.

As indicated previously, different applications should be placed in different X-Containers. FIG. 5 illustrates this in the context of an illustrative embodiment involving two applications that each use a MySQL database. FIG. 5 includes three portions, denoted FIG. 5(a), FIG. 5(b) and FIG. 5(c).

One option would be to create X-Containers for each application plus a third X-Container dedicated to MySQL, as illustrated in FIG. 5(a). That is, this option treats MySQL as its own isolated application. MySQL internally contains access control logic to securely separate the tables of the two applications.

A more secure configuration would create two instances of MySQL, one for each application, each running in its own X-Container, resulting in a total of four X-Containers, as illustrated in FIG. 5(b). This would remove reliance on access control logic within the MySQL implementation and thus strictly increase security of the configuration. In addition, this option would provide better customizability, both of the MySQL servers and the operating system kernels that support them.

However, notice how each application in FIG. 5(b) has its own MySQL instance. Each application relies on its MySQL instance to store its data durably and respond correctly to queries, while conversely each MySQL instance is dedicated and has nothing to lose by being compromised by its own application. Therefore, we can safely deploy only two X-Containers, each containing application logic along with its dedicated MySQL instance, as shown in FIG. 5(c). This option provides significantly better performance than the three or four X-Container configurations shown in FIG. 5(a) and FIG. 5(b) respectively.

For applications running on X-Containers, or containers in general, we can consider two kinds of threats: external and internal, and these may possibly collude. One type of external threat is posed by messages designed to corrupt the application logic. This threat is countered by application and operating system logic and is identical for standard containers and X-Containers. Another type of external threat may try to break through the isolation barrier of a container. In the case of standard containers, this isolation barrier is provided by the underlying general purpose operating system kernel, which has a large TCB and, due to the large number of system calls, a large attack surface. X-Containers, in contrast, rely for isolation in illustrative embodiments on a relatively small X-Kernel that is dedicated to providing isolation. It has a small TCB and a small number of hypervisor calls that are relatively easy to secure. We believe that X-Containers provide strictly better protection to external threats than standard containers.

Internal threats are created by an application relying on third party libraries or, as illustrated by the MySQL example above, by third party services deployed within the same container. In a Linux container, applications trust Linux to implement isolation between processes owned by different user accounts. X-Containers explicitly do not provide secure isolation between processes in the same container. Applications that rely on secure isolation barriers between processes should either use a standard VM and Linux solution or reorganize the application such that conflicting processes run in different X-Containers. The latter would provide better security but requires more implementation effort.

Additional design and implementation details of illustrative embodiments of X-Containers will now be described.

Ideally, containers should provide a secure and self-contained environment for running applications. The following are key principles for designing an architecture for running application containers securely:

1. Self-sufficiency and Customizability: A container should contain all the dependencies of an application. This includes not only libraries, file system layout, and third-party tools, but also the OS kernel. A container should be able to use a customized OS kernel and load its own kernel modules.
2. Compatibility: A container platform ideally should not require changes to applications. Binary level compatibility allows users to deploy containers immediately without rewriting or even re-compiling their applications.
3. Isolation with small TCB: Containers should be securely isolated from one another. Although it is necessary to share privileged software to access shared physical resources, that software must be trusted and should be small.
4. Portability: A key advantage of containers is that they are packaged once and then can be run everywhere, including bare-metal machines and virtualized cloud environments.
5. Scalability and Efficiency: Application containers should be lightweight and executed with small overhead.

In some implementations of X-Containers disclosed herein, we use a hypervisor to serve as the X-Kernel, and we modify a Linux kernel distribution into an X-LibOS instance that allows it to run in the same privilege mode as applications. We more particularly describe the following two example implementations:

1. Para-Virtualized (PV) X-Containers, which run X-LibOS and applications in user mode. Such an implementation illustratively requires modification of the hypervisor (running in kernel mode), but it does not require special hardware support and can be deployed on bare-metal machines as well as in VMs in public clouds.
2. Hardware-assisted Virtualized (HV) X-Containers, which run X-LibOS and applications in kernel mode. Such an implementation illustratively requires hardware virtualization support, but works with unmodified hypervisors.

For the first implementation example above, we have based the X-Kernel implementation on Xen. Xen is open source and support of its para-virtualization interface in Linux is mature. For the second implementation example, we use unmodified Xen with hardware virtualization as the X-Kernel, but other hypervisors could be used as well. For example, we have run HV X-Containers on KVM in Google Compute Engine.

Both implementation examples provide advantageous features. The first implementation allows greater control in how X-Containers are managed. For example, it allows running multiple X-Containers securely isolated from one another in the same VM. Running multiple X-Containers on a single high performance VM will perform better and is more cost effective than running each X-Container in its own, smaller VM. Also, Xen VM management functionalities such as live migration, consolidation, and memory ballooning are supported for PV X-Containers as an added bonus; these are features not well supported in conventional Linux containers.

When hardware virtualization is available, the second implementation tends to have better performance. However, in virtualized environments an HV X-Container needs to take over the whole VM unless nested hardware virtualization is supported. VMs in public clouds generally do not expose nested hardware virtualization.

For the experiments described herein, we derived both versions of X-LibOS from Linux kernel 4.4.44. The modifications to the kernel are in the architecture-dependent layer and transparent to other layers in the kernel. We focused on applications running in x86-64 long mode.

Using Linux gives us binary compatibility, but in addition the Linux kernel is also highly customizable. It has hundreds of booting parameters, thousands of compilation configurations, and many fine-grained runtime tuning knobs. Since most kernel functions can be configured as kernel modules and loaded during runtime, a customized Linux kernel can be highly optimized. For example, for applications that run a single thread, such as many event-driven applications, disabling multi-core and Symmetric Multiprocessing (SMP) support can eliminate unnecessary locking and translation lookaside buffer (TLB) shoot-downs, which greatly improves performance. Depending on the workload, applications can configure the Linux scheduler with different scheduling policies. For many applications, the potential of the Linux kernel has not been fully exploited due to lack of control over kernel configurations or having to share the kernel with other applications. Turning the Linux kernel into a LibOS and dedicating it to a single application can release all this potential.

Illustrative embodiments of the above-noted PV X-Containers will now be described in greater detail. We implemented PV X-Containers based on the Xen para-virtualization (PV) architecture. The PV architecture enables running multiple concurrent Linux VMs (e.g., PV guests or Domain-Us) on the same physical machine without support for hardware-assisted virtualization, but guest kernels require modest changes to work with the underlying hypervisor. In the following, we review key technologies in Xen's PV architecture and its limitations on x86-64 platforms.

In the PV architecture, Xen runs in the most privileged mode (the kernel mode) and both guest kernels and user processes run with fewer privileges. All sensitive system instructions that could affect security isolation, such as installing new page tables and changing segment selectors, are executed by Xen. Guest kernels request those services by performing hypercalls, which are validated by Xen before being served. Exceptions and interrupts are virtualized through efficient event channels.

For device I/O, instead of emulating hardware, Xen defines a simpler split driver model. There is a privileged domain (normally Domain-0, the host domain created by Xen during booting) that gets access to hardware devices and multiplexes the device so it can be shared by other Domain-Us. The Domain-U installs a front-end driver, which is connected to a corresponding back-end driver in Domain-0 through Xen's event channels, and data is transferred using shared memory (asynchronous buffer descriptor rings).

Xen's PV interface has been widely supported by mainline Linux kernels, as it was one of the most efficient virtualization technologies on x86-32 platforms. Because there are four different privilege levels for memory segmentation protection (ring-0 to ring-3), we can run Xen, guest kernels, and user processes in different privilege levels for isolation. System calls can be performed without the involvement of Xen. However, the PV architecture faces a fundamental challenge on x86-64 platforms. Due to the elimination of segment protections in x86-64 long mode, we can only run both the guest kernel and user processes in user mode. To protect the guest kernel from user processes, the guest kernel needs to be isolated in another address space. Each system call needs to be forwarded by the Xen hypervisor as a virtual exception, and incurs a switch of page table and TLB flush. This involves significant overhead and is one of the main reasons why 64 bit Linux VMs prefer to run fully virtualized today, in hardware virtualization instead of para-virtualization.

Aspects relating to elimination of kernel isolation in PV X-Containers will now be described.

The PV X-Container architecture is similar to the Xen PV architecture, with one key difference being that the guest kernel (i.e., the X-LibOS) is not isolated from user processes. Instead, they use the same segment selectors and page table privilege level so that kernel access no longer requires a switch between (guest) user mode and (guest) kernel mode, and system calls can be performed with function calls.

This leads to a complication: Xen needs to know whether the CPU is in guest user mode or guest kernel mode for correct syscall forwarding and interrupt delivery. Xen does this using a flag that it can maintain because all user-kernel mode switches are handled by Xen. However, in X-LibOS, with lightweight system calls and interrupt handling as described herein, guest user-kernel mode switches do not involve the X-Kernel anymore. Instead, the X-Kernel determines whether the CPU is executing kernel or process code by checking the location of the current stack pointer. As in the normal Linux memory layout, X-LibOS is mapped into the top half of the virtual memory address space and is shared by all processes. The user process memory is mapped to the lower half of the address space. Thus, the most significant bit in the stack pointer indicates whether it is in guest kernel mode or guest user mode.

In para-virtualized Linux, the "global" bit in the page table is disabled so that switching between different address spaces causes a full TLB flush. This is not needed for X-LibOS, thus the mappings for the X-LibOS and X-Kernel both have the global bit set in the page table. Switching between different processes running on the same X-LibOS do not require a full TLB flush, which greatly improves the performance of address translation. Context switches between different X-Containers do trigger a full TLB flush.

Because the kernel code is no longer protected, kernel routines would not need a dedicated stack if there were only one process. However, the X-LibOS supports multiple processes. Therefore, we still need dedicated kernel stacks in the kernel context, and when performing a system call, a switch from user stack to kernel stack is necessary.

Aspects relating to lightweight interrupt handling in PV X-Containers will now be described.

In the Xen PV architecture, interrupts are delivered as asynchronous events. There is a variable shared by Xen and the guest kernel that indicates whether there is any event pending. If so, the guest kernel issues a hypercall into Xen to have those events delivered. In the X-Container architecture, the X-LibOS is able to emulate the interrupt stack frame when seeing any pending events and jump directly into interrupt handlers without trapping into the X-Kernel first.

To return from an interrupt handler, an iret instruction is used to reset code and stack segments, stack pointer, flags, and instruction pointer together. Interrupts must also be enabled atomically. But in the Xen PV architecture virtual interrupts can only be enabled by writing to a memory location, which cannot be performed atomically with other operations. To guarantee atomicity and security when switching privilege levels, Xen provides a hypercall for implementing iret. In the X-Container architecture, we can implement iret completely in user mode.

There are two challenges when implementing iret in user mode: First, all general registers must be restored before jumping back to the return address, so temporary values such as the stack and instruction pointers can only be saved in memory instead of registers. Second, without issuing hypercalls, virtual interrupts cannot be enabled atomically with other operations. So the code manipulating the temporary values saved in memory must support reentrancy.

There are two cases to consider. When returning to a place running on the kernel mode stack, the X-LibOS pushes temporary registers on the destination stack including the return address, and switches the stack pointer before enabling interrupts so preemption is guaranteed to be safe. Then the code jumps to the return address by using a simple ret instruction. When returning to the user mode stack, the user mode stack pointer might not be valid, so X-LibOS saves temporary values in the kernel stack for system call handling, enables interrupts, and then executes the iret instruction. Similar to iret, the sysret instruction, which is used for returning from a system call handler, is optimized without trapping to kernel mode. It is easier to implement sysret because it can leverage certain temporary registers.

Illustrative embodiments of the above-noted HV X-Containers will now be described in greater detail. The generality of PV X-Containers as described above comes with the cost of performing all sensitive system instructions through hypercalls, including page table manipulations and context switches. HV X-Containers eliminate this cost if hardware virtualization support is available.

With hardware virtualization support, X-LibOS can run in kernel mode and execute most privilege instructions directly, which greatly improves performance of page table management and context switches. The major challenge comes from running user processes in kernel mode as well. In addition to modifying the memory and CPU management components in the Linux kernel so that user processes can run in kernel mode, we also need to change how interrupts and exceptions are handled. Because the CPU delivers interrupts and exceptions directly in HV X-Containers, X-Kernel does not have control over how they are handled. The default behavior on the x86 platforms is that no stack switch happens when there is an interrupt or exception in kernel mode. This implies that the interrupt handler can execute on the user stack directly, which breaks a basic assumption in user code and kernel code: the data on the user stack can be compromised, and much code in the Linux kernel would need to change in order to handle such a situation correctly.

Fortunately, x86-64 introduces a new interrupt stack-switch mechanism, called the Interrupt Stack Table (IST), to force a stack switch on interrupts and exceptions. By specifying a tag in the Interrupt Descriptor Table (IDT), the CPU will switch to a new stack pointer even if the privilege level is not changed. However, nested interrupts become a problem in this case if the same stack pointer is re-used. We solved this problem by specifying a temporary stack pointer in the IST. Right after entering the interrupt handler, we copy the stack frame to the normal kernel stack so that the same stack pointer can be used for nested interrupts.

Aspects relating to lightweight system calls in both PV and HV X-Containers will now be described.

In the x86-64 architecture, user mode programs perform system calls using the syscall instruction, which transfers control to a routine in kernel mode. The X-Kernel immediately transfers control to the X-LibOS, guaranteeing binary level compatibility so that existing applications can run on the X-LibOS without any modification.

Because the X-LibOS and the process both run in the same privilege level, it is more efficient to invoke system call handlers directly. However, a challenge arises from the setting of the GS segment. The Linux kernel stores per-CPU variables in the GS segment. This segment is set by a swapgs instruction on entering the kernel for every system call, and re-set before returning to the user program. Unfortunately, the swapgs instruction is only valid in kernel mode. It is possible to change the per-CPU variable placement by avoiding the use of segmentation. But to keep the change to Linux kernel minimal, we instead disable the GS segment switch when entering or leaving the X-LibOS, keeping the GS segment valid all the time. Although x86-64 applications might use the FS segment for thread local storage, the GS segment is typically not touched. We have not yet seen any application that needs a customized GS segment.

Another challenge comes from the mechanism of enabling lightweight system calls. X-LibOS stores a system call entry table in a vsyscall page, which is mapped to a fixed virtual memory address in every process. Updating X-LibOS will not affect the location of the system call entry table. Using this entry table, applications can optimize their libraries and binaries for X-Containers by patching the source code to change system calls into function calls, as most existing LibOSs do. But it significantly increases deployment complexity, and it cannot handle third-party tools and libraries that do not have source code available. To avoid re-writing or re-compiling the application, we implemented an online Automatic Binary Optimization Module (ABOM) in the X-Kernel for PV X-containers and in X-LibOS for HV X-Containers. It replaces syscall instructions with function calls automatically on the fly. There are many challenges for in-place binary replacement:

1. Binary level equivalence: the total length of the patched instructions cannot be changed, and the program must perform exactly the same functions even when the application code jumps into the middle of a patched block.
2. Position-independence: we can only call an absolute address stored in memory or a register, instead of a relative address displacement, because libraries such as glibc are loaded in different locations for different processes.
3. Minimum performance impact: it is impractical to scan the whole binary when loading the application or during runtime.
4. Handling read-only pages: most of the binary code is mapped read-only in memory. The binary replacement cannot trigger copy-on-write mechanisms in X-LibOS, otherwise potentially many copies of the same memory page may be created for different processes.
5. Concurrency safety: the same piece of code can be shared by multiple CPUs running different threads or processes. The replacement should be done atomically without affecting or stopping other CPUs.
6. Swapping safety: memory swapping may happen during the replacement. The system should be able to detect and handle it correctly without compromising memory or causing high performance overhead.

ABOM performs binary replacement on the fly when receiving a syscall request from user processes, avoiding scanning the entire binary file. Before forwarding the syscall request, ABOM checks the binary around the syscall instruction to see if it matches any pattern that it recognizes. If it does, ABOM temporarily disables the write-protection bit in the CR-0 register, so that code running in kernel mode can change any memory page even if it is mapped read-only in the page table. ABOM then performs the binary patch with atomic cmpxchg instructions. Since each cmpxchg instruction can handle at most eight bytes, if we need to modify more than eight bytes, we need to make sure that any intermediate state of the binary is still valid for the sake of concurrency safety. The patch is mostly transparent to X-LibOS, except that the page table dirty bit will be set for read-only pages. X-LibOS can choose to either ignore those dirty pages, or flush them to disk so that the same patch is not needed in the future.

A bigger problem is to handle swapping safety. Especially in PV X-Containers, although the decision of memory swapping is made by X-LibOS, all page table manipulations are done through hypercalls in the X-Kernel. X-Kernel can lock the page table to prevent swapping during binary replacement, but this can cause higher performance overhead. We ended up implementing the binary replacement as follows: binary replacement runs in the context of system calls, so if the target page is swapped out right before the replacement, writing to the page will trigger a page fault. ABOM captures this page fault and continues to forward the system call without propagating it to the page fault handler of X-LibOS. ABOM will try to patch the same location next time when it is executed.

FIG. 6 illustrates three patterns of binary code that ABOM recognizes. To perform a system call, programs typically set the system call number in the rax or eax register with a mov instruction, and then execute the syscall instruction. The syscall instruction is two bytes, and the mov instruction is 5 or 7 bytes depending on the size of operands. We replace these two instructions with a single call instruction with an absolute address stored in memory, which can be implemented with 7 bytes. The memory address of the entry points is retrieved from the system call entry table stored in the vsyscall page. The binary replacement only need to be performed once for each place.

With 7-byte replacements, we merge two instructions into one. There is a rare case that the program jumps directly to the location of the original syscall instruction after setting the rax register somewhere else or after an interrupt. After the replacement, this will cause a jump into the last two bytes of our call instruction, which are always "0x60 0xff". These two bytes cause an invalid opcode trap into the X-Kernel (PV) or X-LibOS (HV). To provide binary level equivalence, we add a special trap handler in the X-Kernel (only in the case of PV) and X-LibOS to fix the trap by moving the instruction pointer backward to the beginning of the call instruction. We have only seen this triggered during the boot time of some operating systems.

As illustrated in FIG. 6, 9-byte replacements are performed in two phases, with each one of them generating results equivalent to the original binary. Since the mov instruction takes 7 bytes, we replace it directly with a call into the syscall handler. We can leave the original syscall instruction unchanged, just in case the program jumps directly to it. But we further optimize it with a jump into the previous call instruction. The syscall handler in X-LibOS will check if the instruction on the return address is either a syscall or a specific jmp to the call instruction again. If it is, the syscall handler modifies the return address to skip this instruction.

Our online binary replacement solution only handles the case when the syscall instruction immediately follows a mov instruction. For more complicated cases, it is possible to inject some code into the binary and re-direct a bigger chunk of code. We also provide a tool to do it offline. For most standard libraries such as glibc, the default system call wrappers typically use the pattern illustrated in FIG. 6. The present embodiment is therefore sufficient for optimizing most system call wrappers on the critical path.

Aspects relating to lightweight bootstrapping of Docker images in both PV and HV X-Containers will now be described.

X-Containers do not have a VM disk image and do not go through the same bootstrapping phase that a VM does. To bootstrap an X-Container, the X-Kernel loads an X-LibOS with a special bootloader into memory and jumps to the entry point of the X-LibOS directly. The bootloader initializes virtual devices, including setting IP addresses, and then spawns the process in the container without running any unnecessary services. The first process in the container can fork additional processes if necessary. In addition, HV X-LibOS can be also loaded by GNU GRand Unified Bootloader (GRUB) with the special bootloader without the help of underlying hypervisors. This approach makes X-Containers smaller than a typical VM and faster to boot. For example, we are able to spawn a new Ubuntu-16 X-Container with a single bash process within three seconds, with a memory size of 64 MB.

Because X-Containers support binary level compatibility, we can run any existing Docker image without modification. We connect our X-Container architecture to the Docker platform with a Docker Wrapper. An unmodified Docker engine running in the Host X-Container is used to pull and build Docker images. We use devicemapper as the storage driver, which stores different layers of Docker images as thin-provisioned copy-on-write snapshot devices. The Docker Wrapper then retrieves the meta-data from Docker, creates the thin block device and connects it to a new X-Container. The processes in the container are then spawned with a dedicated X-LibOS.

Example implementations of certain illustrative embodiments described above were evaluated against conventional arrangements in order to demonstrate various advantageous of these illustrative embodiments.

Figure 7:
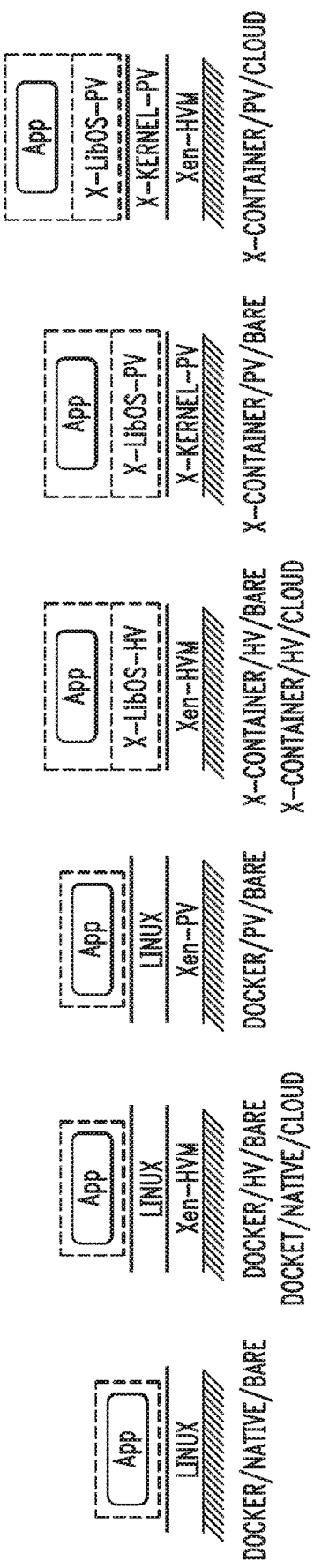
FIG. 7 shows examples of software stacks that are utilized in evaluation of illustrative embodiments.

FIG. 7 shows examples of software stacks that are utilized in this evaluation of illustrative embodiments. In this figure, a dashed box indicates a Docker container or X-Container. A solid line indicates an isolation boundary between privilege levels. A dotted line indicates a library interface.

As part of the evaluation, we conducted experiments on both bare-metal machines and on VMs in public clouds. For bare-metal experiments, we used four Dell PowerEdge R720 servers (two 2.9 GHz Intel Xeon E5-2690 CPUs, 16 cores, 32 threads, 96 GB memory, 4 TB disk), connected to one 10 Gbit switch. For the cloud environment, we ran experiments in four VMs in the Amazon EC2 North Virginia region (m3.xlarge instances, 2 CPU cores, 4 threads, 15 GB memory, and 2 40 GB SSD storage).

As a baseline we ran a Docker container platform both on bare-metal and in an Amazon HV machine. We call these two configurations Docker/native/bare and Docker/native/cloud respectively. We contrasted their performance against Docker containers running in individual Xen HV and PV Domain-U VMs and against X-Containers. This led to six additional configurations: Docker/HV/bare, Docker/PV/bare, X-Container/HV/bare, X-Container/PV/bare, X-Container/HV/cloud, and X-Container/PV/cloud. FIG. 7 illustrates the various software stacks of these configurations. Note that of these eight configurations, three run in the cloud and five on bare-metal.

The host (either a physical machine or an Amazon EC2 instance) running native Docker had Ubuntu 16.04-LTS installed with Docker engine 17.03.0-ce and Linux kernel 4.4.44. The host running Xen VMs had CentOS-6 installed in Domain-0, and Ubuntu 16.04-LTS in Domain-Us with Docker engine 17.03.0-ce, Linux kernel 4.4.44, and Xen 4.2. The host running X-Containers used X-LibOS based on Linux kernel 4.4.44, and CentOS-6 as the Host X-Container. Docker containers used the default NUMA-aware Linux scheduler, with IRQ-balance service turned on. The Domain-0 and Host X-Container were configured with dedicated CPU cores, and we manually balanced IRQ to different cores. Other VMs or X-Containers were evenly distributed to other CPU cores according to the NUMA placement.

For each set of experiments, the same Docker image was used. The Docker engines were all configured with device-mapper storage drivers. When running network benchmarks that involved a client or a server, a separated machine or VM was used.

Because applications running in X-Containers have full control over X-LibOS, they can disable Symmetric Multi-processing (SMP) and multi-core support when there is only a single thread busy. This optimization can improve performance significantly in many cases, eliminating concurrency management and TLB shoot-down. Applications running in Docker containers cannot do this kind of optimization because it requires root privilege. In the microbenchmarks and macrobenchmarks that follow, we performed both single-process and multi-process tests. We disabled SMP support in X-LibOS for single-process cases.

For most experiments described herein we report the average of five runs and also show standard deviation.

We evaluated the performance of X-Containers with a set of microbenchmarks. We started with an Ubuntu16 Docker image, and ran UnixBench and iperf in it. The Execl benchmark measures the speed of the exec system call, which overlays a new binary on the current process. The File Copy benchmarks test the throughput of copying files with different buffer sizes. The Pipe Throughput benchmark measures the throughput of reading and writing in a pipe. The Pipe-based Context Switching benchmark tests the speed of two processes communicating with a pipe. The Process Creation benchmark measures the performance of spawning new processes with the fork system call. The System Call benchmark tests the speed of issuing a series of system calls including dup, close, getpid, getuid, and umask. Finally, the iperf benchmark tests the performance of TCP transfer. For concurrent tests, we ran 4 copies in bare-metal experiments, and 2 copies in Amazon EC2 experiments since the EC2 instance had only two CPU cores.

FIG. 8 shows the relative performance of the various FIG. 7 configurations against the above-described microbenchmarks. FIG. 8 includes four portions, denoted FIG. 8(a), FIG. 8(b), FIG. 8(c) and FIG. 8(d).

It was generally found that X-Containers have significantly higher system call throughput because we turned system calls into lightweight function calls. For single-process benchmarks we optimized X-LibOS by disabling SMP support, and as a result X-Containers significantly outperform Docker. X-Container/PV had significant overheads compared to Docker/Native in process creation and context switching, especially in virtualized environments such as Amazon EC2. This is because process creation and context switches involves many page table operations, which must be done in the X-Kernel. X-Container/HV removes this overhead and achieved better performance than both Docker/native and Docker/HV/bare. Docker/HV/bare achieves better performance than Docker/native/bare in file copy benchmarks because there is an extra layer of disk caching.

We also evaluated the performance of X-Containers with two macrobenchmarks, with evaluation results being shown in FIG. 9. FIG. 9 includes four portions, denoted FIG. 9(a), FIG. 9(b), FIG. 9(c) and FIG. 9(d). The evaluation results for NGINX web server throughput are shown in FIGS. 9(a) and 9(b), and the evaluation results for kernel compilation time are shown in FIGS. 9(c) and 9(d).

For the NGINX server, we ran Docker image NGINX: 1.11 on all platforms. We used the wrk benchmark to test the throughput of the NGINX server with both single and multiple worker processes. The wrk client started 10 threads and 100 connections for each worker process in the NGINX server. On bare-metal machines, Docker containers and X-Containers used a bridged network and can be connected to clients directly. On Amazon EC2, they used a private network with port forwarding. Note that X-Container/HV/ cloud took over the whole HVM in EC2, so it got access to the network without port forwarding. For kernel compilation tests, we used the Ubuntu-16.04 Docker image and installed compilation tools in it. We compiled the latest 4.10 Linux kernel with the "tiny" configuration. Concurrent tests are performed by running 4 parallel jobs in bare-metal experiments and 2 parallel jobs in Amazon EC2 experiments.

FIGS. 9(a) and 9(b) show the NGINX web server throughput measured on bare-metal machines and Amazon EC2. X-Containers consistently outperformed Docker containers inside Xen VMs due to kernel customization and reduced system call overhead. When running a single worker process, X-Container/PV/bare and X-Container/HV/ bare were further optimized by disabling SMP support and achieved 5% and 23% higher throughput than Docker/ native/bare containers respectively. When running concurrent worker processes on bare-metal, the performance of X-Containers was comparable to Docker/native/bare containers. In Amazon EC2, X-Containers/HV/cloud achieved 69% to 78% higher throughput than Docker/native/cloud since it took over the whole HVM and ran without port forwarding. Due to context switch overhead, X-Containers/ PV/cloud had a 20% performance loss in concurrent tests compared to Docker/native/cloud. This result shows that for network I/O intensive workloads, X-Containers perform better than VMs and in many cases even better than native Docker containers.

FIGS. 9(c) and 9(d) show the kernel compilation time on bare-metal machines and Amazon EC2 instances, with lower kernel compilation time being better than higher kernel compilation time. Similar to NGINX experiments, single-process X-Containers on bare-metal machines performed significantly better than Docker containers running natively or in VMs. We did not see a similar improvement in Amazon EC2, which we suspect is due to another layer of I/O scheduling. The performance of PV X-Containers suffered slightly because of the high overhead of page table management in para-virtualized environments, slowing down operations such as fork and exec. This result shows that, for CPU intensive workloads, the performance benefit we can get from lighter-weight system calls is limited, but a performance boost is still possible by kernel customization.

Figure 10:
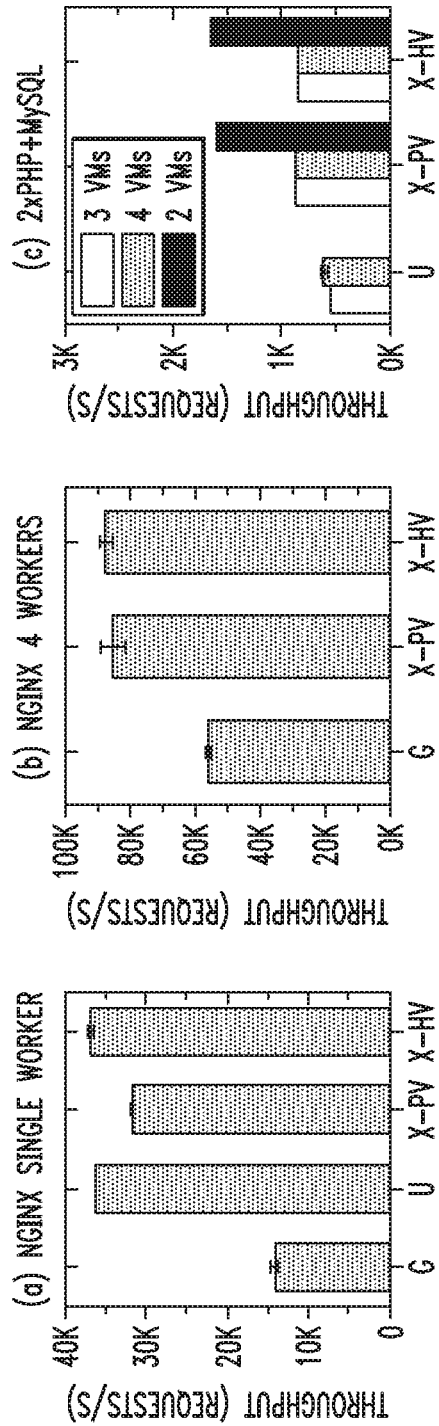

Illustrative embodiments of X-Containers were also compared to Graphene and Unikernel, with the results being shown in FIG. 10. FIG. 10 includes three portions, denoted FIG. 10(a), FIG. 10(b) and FIG. 10(c).

For these comparisons, we ran the wrk benchmark with NGINX webserver, PHP, and MySQL database on bare-metal machines. Graphene ran on Linux with Ubuntu-16.04, and was compiled without the security isolation module (which should improve its performance). For Unikernel, we used Rumprun because it can run those applications with minor patches (running with MirageOS requires rewriting the entire application with OCaml). Unikernel does not support running in Xen HV, so we only tested it with PV mode.

FIG. 10(a) compares the throughput of NGINX webserver serving static webpages with a single worker process. As there is only one NGINX server process running, we optimized X-Containers by disabling SMP. X-Containers achieved throughput comparable to Unikernel, and over twice that of Graphene.

FIG. 10(b) shows a case of running 4 worker processes of a single NGINX webserver. This is not supported by Unikernel, so we only compared to Graphene. In this case, X-Containers outperformed Graphene by more than 50%. The performance of Graphene was limited because in Graphene multiple processes use IPC calls to coordinate access to a shared POSIX library, which causes significant overhead.

We evaluated the scenario previously described in conjunction with FIG. 5, where two PHP CGI servers are connected to MySQL databases. We enabled the built-in webserver of PHP, and used the wrk client to access a page that issued requests to the database (with equal probability for read and write). As shown in FIG. 5, the PHP servers can either share the database or have separated ones. Graphene does not support PHP CGI server, so we only compared to Unikernel. The total throughput of two PHP servers was measured with different configurations, with the results shown in FIG. 10(c). All VMs were running single process with one CPU core. With 3-VM and 4-VM configurations, X-Containers outperformed Unikernel by more than 40%. We believe this is because the Linux kernel is better optimized than the Rumprun kernel. Further, X-Containers support running PHP and MySQL in a single container, which is not possible for Unikernel. This convenience also significantly helps performance: X-Container throughput was about three times that of the Unikernel setup.

Figure 11:
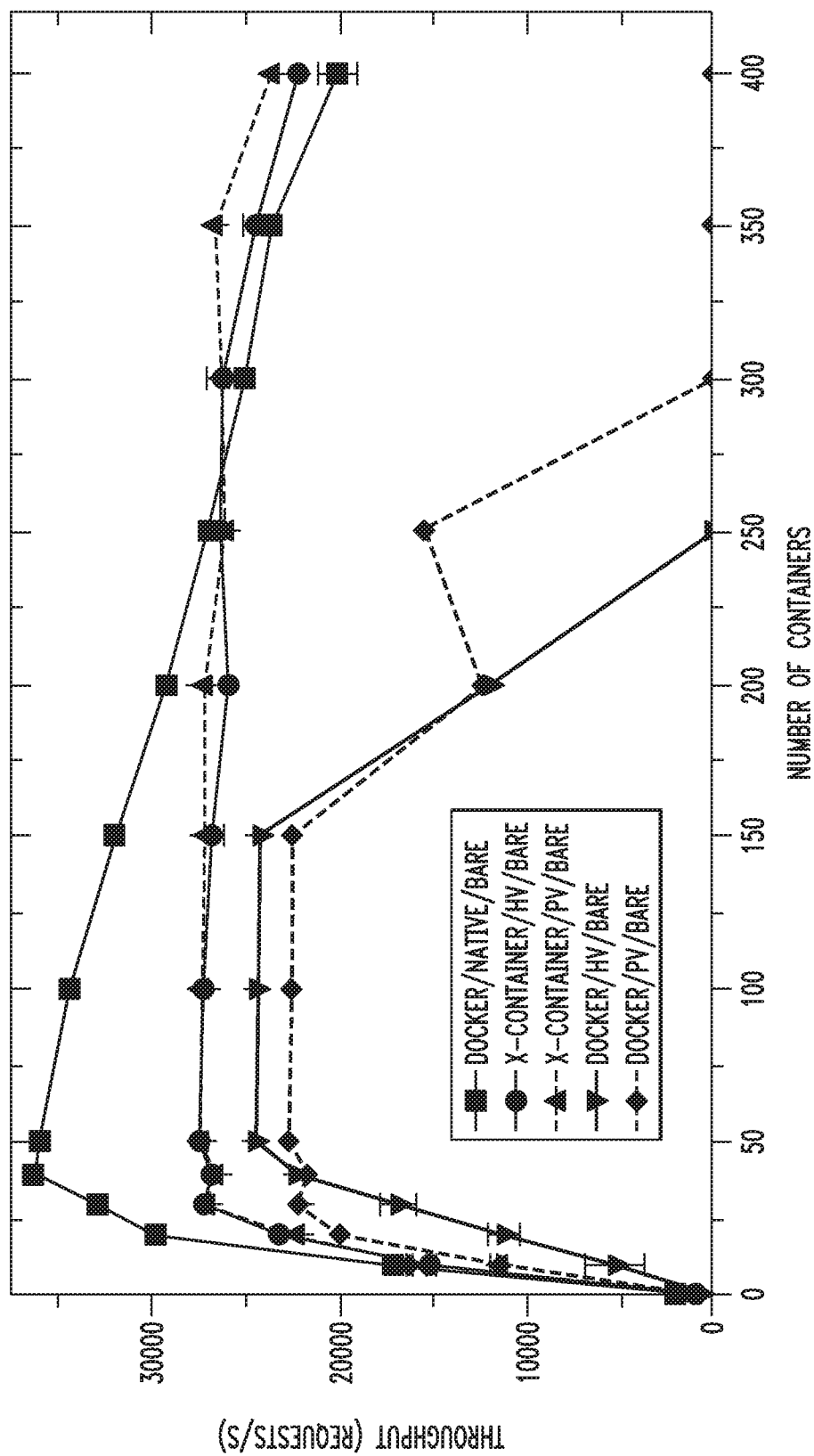

Scalability evaluations of illustrative embodiments were also performed, with the results being shown in FIG. 11.

We evaluated the scalability of the X-Container architecture by running up to 400 containers on one physical machine. For this experiment we used an NGINX server with a PHP-FPM engine. We used the webdevops/PHP-NGINX Docker image and configured NGINX and PHP-FPM with a single worker process. We ran the wrk benchmark to measure the total throughput of all containers. Each container has a dedicated wrk thread with 5 concurrent connections, thus the total number of wrk threads and concurrent connections increases linearly with the number of containers.

Each X-Container was configured with a single virtual CPU and 128 MB memory, with X-LibOS optimized by disabling SMP support. It should be noted that X-Containers can operate with lower amounts of memory (e.g., 64 MB memory), but 128 MB memory size is sufficiently small to boot 400 X-Containers. For Docker/HV/bare and Docker/PV/bare, each Xen VM was assigned one virtual CPU and 512 MB memory (512 MB is the recommended minimum size for Ubuntu-16 OS). However, because the physical machine only has 96 GB memory, we had to change the memory size of the VMs to 256 MB when starting more than 200 VMs. We found that the VMs could still boot but the network stacks started dropping packets. We were not able to boot more than 250 PV instances or more than 200 HV instances correctly on Xen.

FIG. 11 shows the aggregated throughput of all bare-metal configurations. We can see that Docker/native/bare containers achieved higher throughput for small numbers of containers. This is because context switching between Docker containers is cheaper than between X-Containers and between Xen VMs. However, as the number of containers increased, the performance of Docker containers dropped faster. This is because each NGINX+PHP container ran 4 processes: with N containers, the Linux kernel running Docker containers was scheduling 4N processes, while X-Kernel was scheduling N virtual CPUs, each running 4 processes. This hierarchical scheduling turned out to be a more scalable way of scheduling many containers together, and with N=400 X-Container/PV/bare outperformed Docker/native/bare by 18%.

The evaluations further demonstrated additional performance benefits of kernel customization, as will now be described with reference to FIG. 12. Illustrative embodiments of X-Containers enable application containers that require customized kernel modules. For example, X-Containers can use software RDMA (both Soft-iwarp and Soft-ROCE) applications. In Docker environments such modules require root privilege and expose the host network to the container directly, raising security concerns.

We tested a scenario with three NGINX web servers and a load balancer. The NGINX web servers are each configured to use one worker process. Docker platforms typically use a user-level load balancer such as HAProxy. HAProxy is a single threaded, event-driver proxy server widely deployed in production systems. X-Containers support HAProxy, but can also use kernel-level load balancing solutions such as IPVS (IP Virtual Server). IPVS requires inserting new kernel modules and changing iptable and ARP table rules, which is not possible in Docker containers without root privilege and access to the host network.

In this experiment, we used the HAProxy:1.7.5 Docker image. The load balancer and NGINX servers were running on the same physical machine. We configured each X-Container with a single virtual CPU, with SMP support turned off in X-LibOS for optimized performance. We used the wrk workload generator and measured total throughput.

Figure 12:
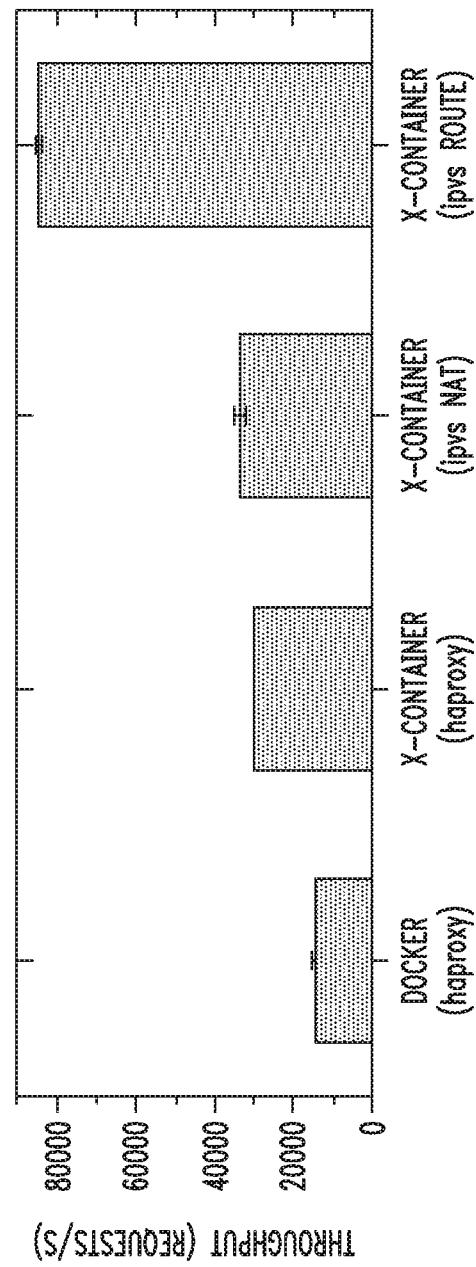

FIG. 12 compares various configurations. The X-Container platform with HAProxy achieved twice the throughput of the Docker container platform. With IPVS kernel level load balancing using NAT mode, X-Containers further improve throughput by 12%. In this case the load balancer was the bottleneck because it served as both web frontend and NAT server. IPVS supports another load balancing mode called "direct routing." With direct routing, the load balancer only needs to forward requests to backend servers while responses from backend servers are routed directly to clients. This requires changing iptable rules and inserting kernel modules both in the load balancer and NGINX servers. With direct routing mode, the bottleneck shifted to the NGINX servers, and total throughput improved by another factor of 1.5.

It is to be appreciated that the particular X-Container embodiments described in conjunction with the above evaluations are examples only, intended to demonstrate advantages of illustrative embodiments, and should not be viewed as limiting in any way.

It is be appreciated that the particular arrangements shown and described in conjunction with FIGS. 1 through 12 are presented by way of illustrative example only, and numerous alternative embodiments are possible. The various embodiments disclosed herein should therefore not be construed as limiting in any way. Numerous alternative arrangements for implementing software containers can be utilized in other embodiments. For example, other types of kernel-based isolation layers can be used in place of the particular X-Kernel arrangements described in conjunction with certain illustrative embodiments. Those skilled in the art will also recognize that alternative processing operations and associated system entity configurations can be used in other embodiments.

It is therefore possible that other embodiments may include additional or alternative system elements, relative to the entities of the illustrative embodiments. Accordingly, the particular system configurations and associated software container and kernel-based isolation layer implementations can be varied in other embodiments.

A given processing device or other component of an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, an ALU, a GPU, a DSP, or other similar processing device component, as well as other types and arrangements of processing circuitry, in any combination. For example, a given processing device as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, flash memory, magnetic memory, optical memory, or other types of storage devices in any combination.

As mentioned previously, articles of manufacture comprising such processor-readable storage media are considered embodiments of the invention. The term "article of manufacture" as used herein should be understood to exclude transitory, propagating signals. Other types of computer program products comprising processor-readable storage media can be implemented in other embodiments.

In addition, embodiments of the invention may be implemented in the form of integrated circuits comprising processing circuitry configured to implement processing operations associated with providing software containers on a kernel-based isolation layer.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality disclosed herein can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

It should again be emphasized that the embodiments of the invention as described herein are intended to be illustrative only. Other embodiments of the invention can be implemented utilizing a wide variety of different types and arrangements of information processing systems, networks and devices than those utilized in the particular illustrative embodiments described herein, and in numerous alternative processing contexts. In addition, the particular assumptions made herein in the context of describing certain embodiments need not apply in other embodiments. These and numerous other alternative embodiments will be readily apparent to those skilled in the art.

What is claimed is:

1. A method comprising:
   implementing a kernel-based isolation layer;
   configuring a software container on the kernel-based isolation layer to include a dedicated operating system kernel as a library operating system; and
   executing one or more user processes in the software container,
   wherein the method is performed by a processing platform comprising a plurality of processing devices each comprising a processor coupled to a memory, and
   wherein the library operating system runs in the software container at a privilege level that is the same as a privilege level of the one or more user processes executing in the software container.

2. The method of claim 1 wherein the kernel-based isolation layer is implemented in the form of an X-Kernel relative to the dedicated operating system kernel of the software container.

3. The method of claim 1 wherein the kernel-based isolation layer comprises one of a virtual machine hypervisor and a host operating system.

4. The method of claim 1 wherein the library operating system is converted from a monolithic operating system kernel of a specified type.

5. The method of claim 1 wherein executing one or more user processes in the software container comprises executing a plurality of user processes in the software container, and further wherein the library operating system runs in the software container at a privilege level that is the same as a privilege level of each of the plurality of user processes executing in the software container.

6. The method of claim 1 wherein the library operating system is configured to support automatic translation of binaries of the one or more user processes in conjunction with converting system calls into corresponding function calls.

7. The method of claim 1 wherein configuring a software container on the kernel-based isolation layer to include a dedicated operating system kernel as a library operating system further comprises:
   extracting a container image of an existing software container; and
   utilizing the extracted container image as a virtual machine image in configuring the software container on the kernel-based isolation layer,
   wherein the software container on the kernel-based isolation layer comprises a wrapped version of the existing software container.

8. The method of claim 7 wherein one or more user processes of the existing software container are permitted to execute as the one or more user processes in the software container on the kernel-based isolation layer without requiring any modification of those one or more user processes.

9. The method of claim 1 wherein configuring a software container on the kernel-based isolation layer to include a dedicated operating system kernel as a library operating system further comprises configuring a plurality of software containers on the kernel-based isolation layer with each of the plurality of software containers including a separate dedicated operating system kernel as a library operating system.

10. The method of claim 9 wherein executing one or more user processes in the software container further comprises executing distinct sets of one or more user processes in respective ones of the plurality of software containers and wherein at least one of the distinct sets comprises a plurality of different user processes.

11. The method of claim 10 wherein a first one of the distinct sets of one or more user processes executing in a first one of the plurality of software containers is isolated from a second one of the distinct sets of one or more user processes executing in a second one of the plurality of software containers.

12. The method of claim 1 wherein configuring the software container comprises configuring the software container as a para-virtualized software container in which the library operating system and the one or more user processes run in a user mode.

13. The method of claim 12 wherein implementing the kernel-based isolation layer on which the para-virtualized software container runs comprises implementing the kernel-based isolation layer as a modified version of a virtual machine hypervisor or operating system kernel.

14. The method of claim 1 wherein configuring the software container comprises configuring the software container as a hardware-assisted virtualized software container in which the library operating system and the one or more user processes run in a kernel mode within a hardware-assisted virtual machine.

15. The method of claim 14 wherein implementing the kernel-based isolation layer on which the hardware-assisted virtualized software container runs comprises implementing the kernel-based isolation layer as a virtual machine hypervisor or operating system kernel.

16. The method of claim 1 wherein the kernel-based isolation layer and the library operating system of the software container are implemented using respective first and second operating systems of different types.

17. The method of claim 1 wherein executing one or more user processes in the software container comprises executing a plurality of user processes in the software container, and further wherein the plurality of user processes comprise at least first and second concurrent user processes having respective different address spaces associated therewith.

18. A system comprising:
a processing platform comprising a plurality of processing devices, each comprising a processor coupled to a memory;
the processing platform being configured:
to implement a kernel-based isolation layer;
to configure a software container on the kernel-based isolation layer to include a dedicated operating system kernel as a library operating system; and
to execute one or more user processes in the software container,
wherein the library operating system runs in the software container at a privilege level that is the same as a privilege level of the one or more user processes executing in the software container.

19. The system of claim 18 wherein the processing platform is configured to provide different sets of one or more software containers on the kernel-based isolation layer for respective different tenants with each such software container including a dedicated operating system kernel as a library operating system.

20. The system of claim 18 wherein the processing platform comprises at least one of:
a cloud-based processing platform;
an enterprise processing platform;
an Internet of Things (IoT) platform; and
a Network Function Virtualization (NFV) platform.

21. A computer program product comprising a non-transitory processor-readable storage medium having stored therein program code of one or more software programs, wherein the program code when executed by a processing platform comprising a plurality of processing devices, each processing device comprising a processor coupled to a memory, causes the processing platform:
to implement a kernel-based isolation layer;
to configure a software container on the kernel-based isolation layer to include a dedicated operating system kernel as a library operating system; and
to execute one or more user processes in the software container,
wherein the library operating system runs in the software container at a privilege level that is the same as a privilege level of the one or more user processes executing in the software container.

22. The computer program product of claim 21 wherein executing one or more user processes in the software container comprises executing a plurality of user processes in the software container, and further wherein the library operating system runs in the software container at a privilege level that is the same as a privilege level of each of the plurality of user processes executing in the software container.

23. The computer program product of claim 21 wherein the library operating system is configured to support automatic translation of binaries of the one or more user processes in conjunction with converting system calls into corresponding function calls.

* * * * *